United States Patent [19]

Okazaki et al.

[11] Patent Number: 5,691,471

[45] Date of Patent: Nov. 25, 1997

[54] ACCELERATION AND ANGULAR VELOCITY DETECTOR

[75] Inventors: Mitsuhiro Okazaki, Kawasaki; Jun Iwasaki, Yokohama, both of Japan

[73] Assignee: Nikon Corporation, Tokyo, Japan

[21] Appl. No.: 557,422

[22] Filed: Nov. 13, 1995

[30] Foreign Application Priority Data

Nov. 16, 1994 [JP] Japan .................................. 6-281032

[51] Int. Cl.$^6$ ...................................................... G01P 9/04
[52] U.S. Cl. ..................... 73/504.041; 73/504.03; 73/504.15
[58] Field of Search ........................... 73/504.04, 504.12, 73/504.14, 504.15, 504.02, 510, 504.11

[56] References Cited

U.S. PATENT DOCUMENTS 4,996,877  3/1991  Stewart et al. .................... 73/504.12
5,359,893  11/1994  Dunn ................................. 73/505
5,531,115  7/1996  Erdley ............................. 73/504.02

FOREIGN PATENT DOCUMENTS 5-248872   9/1993   Japan .
6-258341   9/1994   Japan .
94/23272   10/1994  WIPO ............................... 73/504.12

*Primary Examiner*—John E. Chapman
*Attorney, Agent, or Firm*—Shapiro and Shapiro

[57] ABSTRACT

An acceleration and angular velocity detector comprises a body mass, a flexible portion, which is connected to the body mass, that deforms in consonance with a displacement of the body mass, and a peripheral support for supporting the flexible portion. A vibration device causes the body mass to vibrate circularly in two dimensions. A displacement detection device independently detects displacements of the body mass in three axes directions and outputs a signal and a signal processor calculates acceleration in the three axes directions and angular velocities around three axes by employing the signal that is output by the displacement detection device.

30 Claims, 18 Drawing Sheets

ACCELERATION AND ANGULAR VELOCITY DETECTOR

BACKGROUND OF THE INVENTION

1. Field of the Invention

The present invention relates to an acceleration and angular velocity detector that acquires an acceleration and an angular velocity that correspond to the directions of a plurality of axes.

2. Related Background Art

Currently, in a camera with a vibration stabilizer, an active suspension system in a car, and a navigation system used for cars, planes, and ships, the distance of travel and the attitude of a body in motion are acquired by using an inertia sensor. An acceleration detector and an angular velocity detector serve as such an inertia sensor. With a method that is used for airplanes, the acceleration in three axes directions and the angular velocities around three axes are detected and used to calculate the attitude, the position, and the speed of a plane. Thus, according to the method that is employed for airplanes, three acceleration detectors and three angular velocity detectors are required. A camera with a vibration stabilizer employs two vibration gyros (angular velocity detectors) to detect angular velocities around two axes and thus compensates for image vibration.

According to a conventional method, by which a single acceleration detector is employed to detect the acceleration in a single axis direction, or a single angular velocity detector is employed to detect an angular velocity around a single axis, acceleration detectors and angular velocity detectors are required in the same number as that of the types of the acceleration and the angular velocities (the number of axes for the acceleration and the angular velocities that are to be detected), so that a large number of detectors must be provided. Thus, providing for the detection of the acceleration and the angular velocities that correspond to a plurality of axes will increase the manufacturing cost of a device and will require a large space for the installation of a plurality of detectors.

To resolve such shortcomings, there is proposed in Japanese Patent Application Laid-open No. 5-248872 an acceleration and angular velocity detector that can detect the angular velocity around a single axis and the acceleration in three axes directions.

FIG. 22 is a schematic top plan view of that device. In this device, leg portions 101 are bonded on a silicon substrate 100 in a conductive pattern so they are individually positioned at the four corners of a square. Arm portions 102 (102a, 102b, 102c, and 102d) are formed between the four leg portions 101. The arm portions 102 are not fixed to the substrate 100 but are free. Since throughholes 103 are formed in all of the arms 102 near the leg portions 101, those areas of the arms 102 are flexible. Support arm portions 104 (104a, 104b, 104c, and 104d) extend from the centers of the four arms 102, and a mass portion 105 is provided the distal ends of the support arm portions 104. The support arm portions 104 and the mass portion 105, as well as the arm portion 102, are not fixed to the substrate 100 and float free. In addition, first comb-shaped electrodes 106 (106a, 106b, 106c and 106d) are formed along the outside edges of the center sections of the arm portions 102. The arm portions 102, the support arms 104, the mass portion 105 and the first comb-shaped electrodes 106 constitute an inertia mechanism. Second comb-shaped electrodes 107 (107a, 107b, 107c and 107d) are positioned so that they face the first comb-shaped electrodes 106.

The processing by this device will now be described. Voltages $V_p+V_d\sin\omega t$ and $V_p-V_d\sin\omega t$ are applied to the second comb-shaped electrodes 107a and 107c, respectively, with $V_p$ denoting a direct current bias voltage and $V_d\sin\omega t$ denoting an alternating drive current voltage. Upon the application of these voltages, electrostatic power is generated at the first comb-shaped electrodes 106a and 106c that are positioned opposite the second comb-shaped electrodes 107a and 107c. When a drive frequency is set so that it is equal to a resonance frequency in the x-axis direction, the inertia mechanism is rendered resonant in the x-axis direction. In this condition, when an angular velocity $\Omega_0$ is added around the z-axis (the axis that is perpendicular to the x- and y-axes in FIG. 22), a Coriolis force acts on the mass portion 105 in the y-axis direction, which is perpendicular to the direction of vibration, and due to the Coriolis force, the inertia mechanism is rendered resonant in the y-axis direction also. At this time, the amplitude of the vibration can be acquired by a change in the capacities of two pairs of opposing electrodes, 106b and 107b, and 106d and 107d. Since the amplitude of the vibration is proportional to the angular velocity $\Omega_0$, the angular velocity $\Omega_0$ can be determined by ascertaining the change in the capacities.

As this device can detect the acceleration, the detection of the acceleration will now be explained. Suppose that acceleration $a_x$ and $a_y$ are applied in the x- and y-axes directions. Then, inertial force $f_x=-ma_x$ and $f_y=-ma_y$ act on the mass portion 105, which is located in the center, in the x- and y-axes directions. Here, the character m denotes the mass of the mass portion 105. As a result, a displacement $\delta_x$ that occurs in the x-axis direction can be detected from the changes in the capacities of the two pairs of the comb-shaped electrodes, 106a and 107a, and 106c and 107c. Since the displacement in the x-axis direction is proportional to the acceleration $a_x$ in the x-axis direction, the acceleration $a_x$ in the x-axis direction can be detected by detecting the capacity change. The acceleration in the y-axis direction can be detected in the same manner. The acceleration in the z-axis direction can also be detected by providing an electrode on the bottom of the mass portion 105 and by positioning a fixed electrode at a certain distance from that electrode.

A conventional device, however, can at the maximum detect the acceleration in three axes directions and an angular velocity around only one axis. Since the acceleration in three axes directions and the angular velocities around three axes must be acquired for an airplane, etc., a single conventional device can not acquire the acceleration in the three axes directions and the angular velocities around the three axes.

SUMMARY OF THE INVENTION

To overcome the above described shortcomings, it is one object of the present invention to provide an acceleration and angular velocity detector that, by employment of a single device, can acquire acceleration in three axes directions and angular velocities around three axes.

To achieve the above object, according to the present invention, there is provided an acceleration and angular velocity detector comprising: a body mass; a flexible portion, which is connected to the body mass, that alters a shape in consonance with a displacement of the body mass; a peripheral support member for supporting the flexible portion; vibration means for vibrating the body mass in two dimensions; displacement detection means for independently detecting displacements of the body mass in three axes directions and for outputting a signal; and calculation means for detecting accelerations in the three axes directions and angular velocities around three axes by employing the signal that is output by the displacement detection means.

Preferably, the displacement detection means includes first, second and third bridge circuits, with the first bridge circuit having, in the flexible portion, a first resistor element group, which consists of four resistor elements that are formed along one axis of two intersecting axes, and a first voltage meter; the second bridge circuit having, in the flexible portion, a second resistor element group, which consists of four resistor elements that are formed along the other axis of the two intersecting axes, and a second voltage meter; and the third bridge circuit having, in the flexible portion, a third resistor element group, which consists of four resistor elements that are formed along the other axis of the two intersecting axes, and a third voltage meter. Alternatively, the displacement detection means includes at least four electrodes, which are formed on the bottom surface of the body mass and on a surface that is positioned opposite to the bottom surface; one electrode, which is formed on the other surface; and electric capacity detection means for detecting an electric capacity between each of at least the four electrodes and one electrode.

It is preferable that the vibration means include piezo-electric elements that are formed on the flexible portion, and a vibration signal generator for applying an alternating current voltage to the piezoelectric element. In this case, preferably, the vibration means vibrates the body mass at a frequency that is sufficiently higher than a frequency for an acceleration and an angular velocity that is to be detected.

In addition, it is desirable that the vibration means cause the body mass to vibrate two dimensionally across a plane that is parallel to a plane of the flexible portion, or cause the body mass to vibrate two dimensionally across a plane that is perpendicular to the plane of the flexible portion.

Further, preferably, the calculation means includes a signal dividing section, which divides a signal into a signal having a low frequency component and a signal having a high frequency component, and a synchronous detecting section that extracts a signal having the same frequency component as that of a vibration frequency at which the vibration means vibrates the body mass.

Further, it is preferable that the flexible portion, the body mass and the peripheral support member be made of silicon. It is especially desirable for the piezoelectric elements be composed of PZT.

According to the present invention, a single detector can detect, at the maximum, acceleration in three axes directions and angular velocities around three axes. While conventionally a plurality of detectors are required for the detection of acceleration in the three axes directions and the angular velocities around the three axes, the present invention requires only a single detector for such detection.

The above and other objects, features and advantages of the present invention will be explained hereinafter and may be better understood by referring to the accompanying drawings and the descriptive matter which follows.

DETAILED DESCRIPTION OF THE PREFERRED EMBODIMENTS

The present invention will now be described in detail by referring to embodiments. The present invention, however, is not limited to these embodiments.

A first embodiment of the present invention will be explained in detail.

Figure 1A:
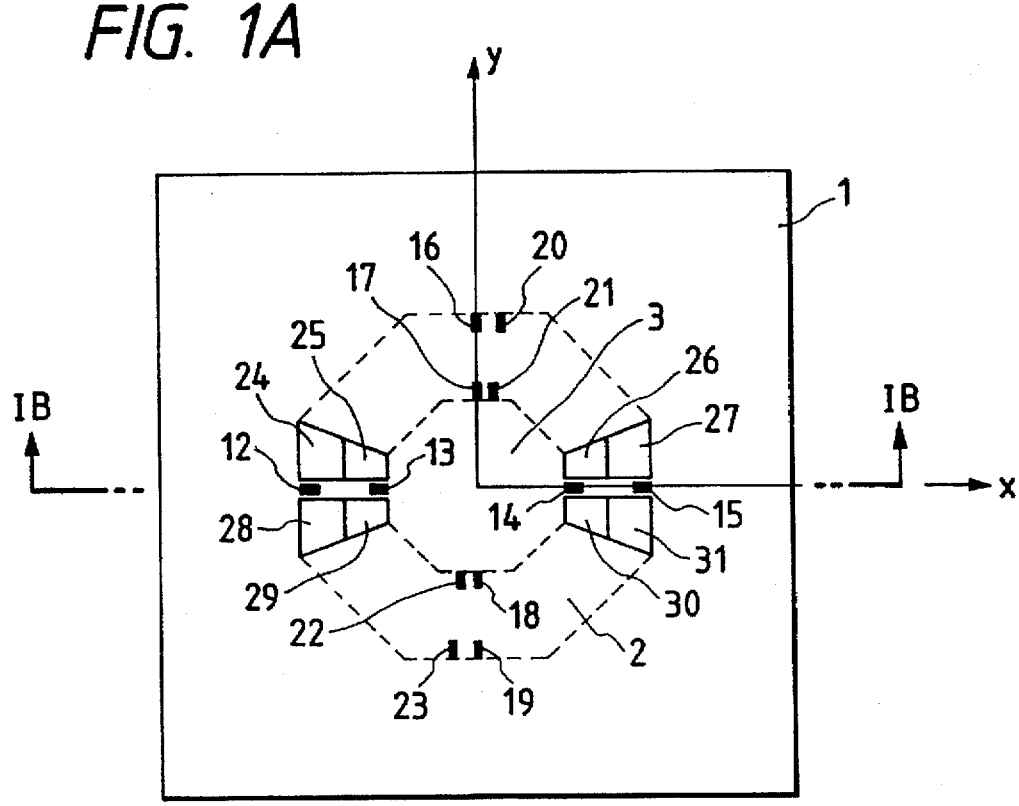
FIG. 1A is a schematic top view illustrating an acceleration and angular velocity detector according to a first embodiment of the present invention.
Figure 1B:
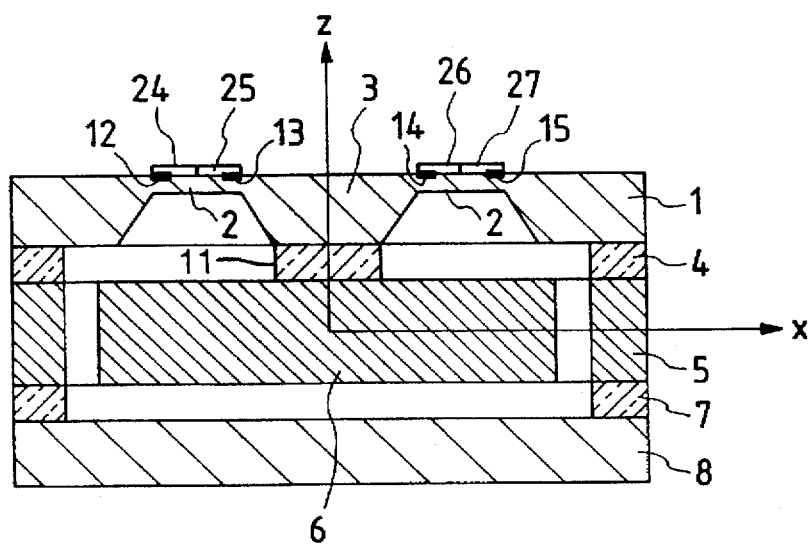
FIG. 1B is a cross sectional view of the acceleration and angular velocity detector taken along the line 1B—1B in FIG. 1A.

FIG. 1A is a schematic top view of an acceleration and angular velocity detector according to the first embodiment of the present invention, and FIG. 1B is its cross sectional view taken along line 1B—1B in FIG. 1A.

The acceleration and angular velocity detector includes a thick peripheral portion 1; a thick central portion 3; a thin flexible portion 2, which couples the peripheral thick portion 1 with the central thick portion 3 and which has on its upper surface resistor elements 12 through 23 and piezoelectric elements 24 through 31; a support member 5, which is coupled to the peripheral thick portion 1 via a glass layer (bonding layer) 4 and which supports the peripheral thick portion 1; a body mass 6, which is coupled to the central thick portion 3 via a glass layer (bonding layer) 11 and which imposes stress on the flexible portion 2 that is in consonance with the acceleration and the angular velocity to which the acceleration and angular velocity detector is subjected; and a mounting board 8, which is coupled with the support member 5 via a glass layer 7. The acceleration and angular velocity detector in the first embodiment has three silicon substrates: the first, the second, and the third substrates. The first substrate is formed of the thick peripheral portion 1, the flexible portion 2 and the thick central portion 3; the second substrate is formed of the support member 5 and the body mass 6; and the third substrate is the mounting board 8. Although not shown in FIGS. 1A and 1B, an electrode is provided on the lower surface and on the upper surface of each of the piezoelectric elements 24 through 31. Although in the first embodiment the body mass 6 is coupled with the flexible portion 2 via the thick portion 3, the body mass 6 may be connected directly to the flexible portion 2 and the intervening thick portion 3 omitted.

Since the acceleration and the angular velocity detector in the first embodiment can be produced by using a semiconductor manufacturing technique, only a brief explanation of the method of its manufacture will be given below.

A silicon substrate is employed for the first, the second, and the third substrates in the first embodiment. The first substrate is a p-type substrate. The first and the third substrates are about 250 μm thick, and the second substrate is about 1.4 mm thick.

Nitride film is formed on the upper and lower surfaces of the first substrate by the LP-CVD method or the like, and then the nitride film on the upper surface of the first substrate is removed. An n-type epitaxial growing layer of 1.0 μm is formed on the upper surface of the first substrate, from which the nitride film has been removed. Following this, a silicon oxide film of 0.6 μm is overlaid. Then, resistor elements (distortion gauge elements) 12 through 23 that detect the deformation of the thin flexible portion 2 are formed by a well known IC planar process (more specifically, diffusion resistors are formed by diffusing impurities) on the upper surface (on the n-type epitaxial growing layer) of an area that defines the flexible portion 2. Then, metal wiring (A1) for connecting the resistor elements 12 through 23 is formed. The metal wiring is insulated from the n-type epitaxial growing layer by a silicon oxide film. The resistor elements 12 through 23 are divided into three groups, the resistor elements 12 through 15, 16 through 19, and 20 through 23, with each group constituting a Wheatstone bridge. A lower electrode (not shown) for applying a voltage to the piezoelectric elements 24 through 31 is formed on the surface where the resistor elements are provided. It should be noted that the lower electrode and the metal wiring are electrically insulated from each other. A PZT (piezoelectric body) is formed on the lower electrode by the sputtering or the hydrothermal method. Then, an upper electrode (not shown) is formed on the PZT. With such a structure, where the PZT is sandwiched between the lower and the upper electrodes, the area of the PZT, to which is applied a voltage between the lower and the upper electrodes, varies in consonance with the value of the applied voltage. Since voltages are applied independently to the piezoelectric elements in the first embodiment, the shapes of the lower and the upper electrodes and the PZT are the same as the shape of the piezoelectric elements 24 through 31. To change the areas of the piezoelectric elements 24 through 31 independently, at least one of the shapes of the lower and the upper electrodes and the PZT may be the same as that of the piezoelectric elements 24 through 31, and one of the lower and the upper electrodes may be separately located (by being insulated) in an independent area that corresponds to the areas of the piezoelectric elements 24 through 31 (for example, the lower electrode may be a common electrode made of one film and the upper electrode may be formed of eight electrodes having substantially the same shape as the piezoelectric elements 24 through 31). In this case, metal wiring for connecting the lower and the upper electrodes and the resistor elements is arranged so that these components are electrically insulated from each other. Etching is performed for the lower face of the first substrate by using a strong alkaline etching solution, such as a potassium hydroxide solution, to form the flexible portion 2. At this time, as a silicon face is not substantially etched, the silicon is etched while a certain angle is maintained. Since electrochemical etching is employed for the etching, the etching process can be stopped at the face of the n-type epitaxial growing layer.

Following this, the Glass layers 4 and 11 are formed on the upper face of the support member 5, which is the second substrate, and the first substrate and the second substrate are bonded together by the anode joining method. Then, the second substrate is cut and shaped so as to provide the body mass 6 and the support member 5.

Then, the glass layer 7 is formed on the upper face of the third substrate (the mounting board), and the third substrate and the second substrate are bonded together by the anode joining method.

A mass portion of the detector in the first embodiment includes the thick central portion 3, the glass layer 11, and the body mass 6. The flexible portion 2 is shown as a thin structure whose internal and external shape is an octagon, but it may also be a circular structure or a polygonal structure other than the octagonal structure. Further, the flexible portion 2 may be made by combining beam members as long as the body mass 6 can be vibrated in the x-, y-, and z-axes directions.

The vibration means for the body mass 6 in the first embodiment is constituted by the eight piezoelectric elements that are provided in the flexible portion 2 and a vibration signal generator (not shown). Although PZT is used for the piezoelectric element in the first embodiment, ZnO may be also used. Further, the piezoelectric element may be replaced by a magnetostrictive element, etc.

Figure 3A:
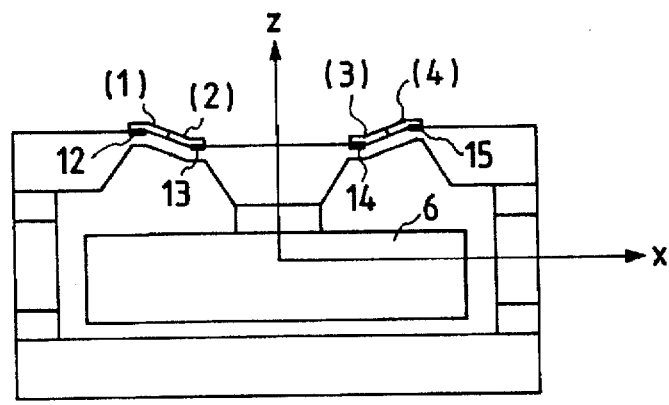
FIGS. 3A through 3D are diagrams for explaining the state of a body mass in the acceleration and angular velocity detector when it is subjected to vibration according to the first embodiment of the present invention.
Figure 3B:
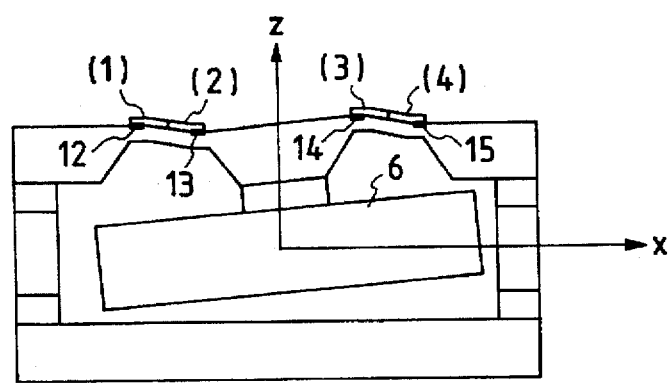
Figure 3C:
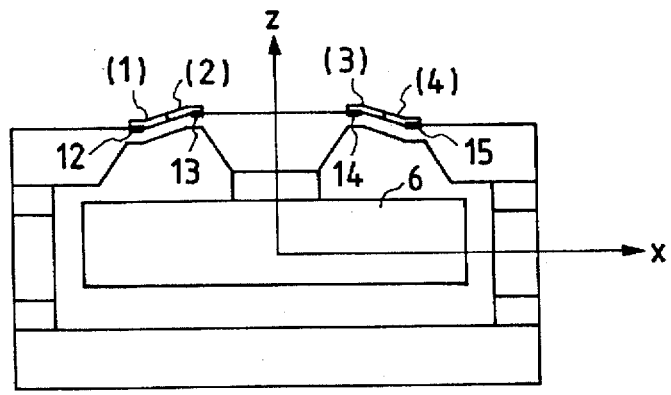
Figure 3D:
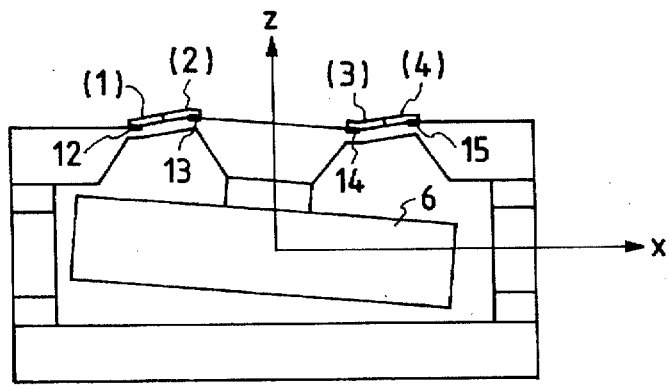
Figure 4:
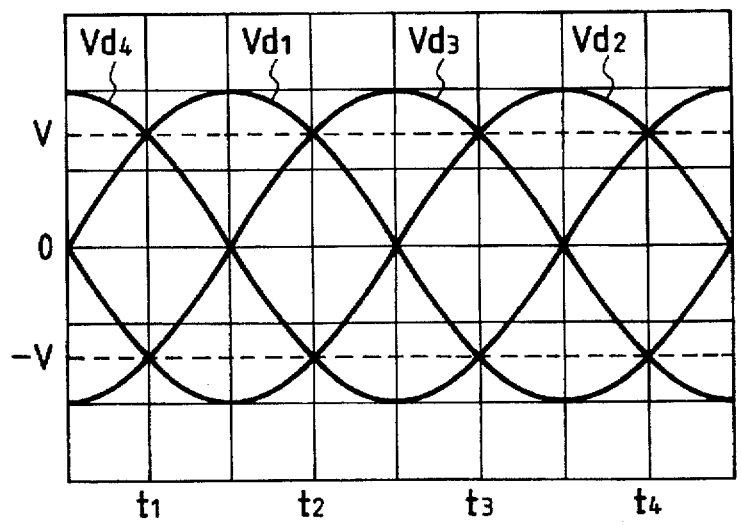
FIG. 4 is a graph showing a waveform for a voltage that is applied to a piezoelectric element in the acceleration and angular velocity detector according to the first embodiment of the present invention.

The state of the body mass 6 in the acceleration and angular velocity detector when it is subjected to vibration will now be explained while referring to FIGS. 3A through 3D. Since the same voltage is applied to the piezoelectric elements, 24 and 28, 25 and 29, 26 and 30, and 27 and 31, which in turn function the Same, these elements are called piezoelectric element pairs (1), (2), (3), and (4) when they are handled in the same manner. The states of the voltages that are applied to the upper electrodes of the piezoelectric element groups (1) through (4) are shown in FIG. 4. As the vertical axis in FIG. 4 indicates a voltage and the horizontal axis indicates time, $V_{d1}$, $V_{d2}$, $V_{d3}$ and $V_{d4}$ are descriptive waveforms of the voltages that are applied to the upper electrodes of the piezoelectric element groups (1) through (4). The electric potential of the lower electrodes provided on the lower faces of the piezoelectric element groups (1) through (4) is a ground level. When a voltage is applied to the upper and the lower electrodes that are provided on the upper and the lower faces of the piezoelectric element groups (1) through (4) and an electric field is provided to these groups, so that the piezoelectric element groups (1) and (4) expand inward the face of the flexible portion 2 and the piezoelectric element groups (2) and (3) contract inward the face of the flexible portion 2, the shape of the flexible portion 2 is changed, as is shown in FIG. 3A. More specifically, at time $t_1$ in FIG. 4, a +V voltage is applied to the upper electrodes of the piezoelectric element groups (1) and (4), while a −V voltage is applied to the upper electrodes of the piezoelectric element groups (2) and (3). Then, when a voltage is applied to the upper electrodes of the piezoelectric element groups (1) through (4) in order to expand the piezoelectric element groups (1) and (4) and to contract the piezoelectric element groups (2) and (3), the shape of the flexible portion 2 is changed, as is shown in FIG. 3B. The timing for the application of the voltage to the upper electrodes provided on the upper faces of the individual piezoelectric element groups is time $t_2$ in FIG. 4. When a voltage is applied in the same manner, so that the piezoelectric element groups (2) and (3) expand and the piezoelectric element groups (1) and (4) contract, the shape of the flexible portion 2 is varied, as is shown in FIG. 3C. The timing at this time for the application of the voltage to the upper electrodes located on the upper faces of the piezoelectric element groups is time $t_3$ in FIG. 4. When the voltage is applied so as to expand the piezoelectric element groups (2) and (4) and to contract the piezoelectric element groups (1) and (3), the flexible portion 2 is changed, as is shown in FIG. 3D. The timing at this time of the voltage application to the upper electrodes provided for the upper faces of the piezoelectric element groups is time $t_4$ in FIG. 4. Therefore, when, as is shown in FIG. 4, the vibration signal generator alters a voltage, which is to be applied to the piezoelectric element groups (1) through (4), the body mass 6 vibrates circularly (two dimensionally). If the vibration frequency of the body mass 6 almost matches the inherent vibration count of the body mass 6, the amplitude of the body mass 6 is increased.

The detection principle of the acceleration and angular velocity detector is shown in FIGS. 5A through 10B.

Figure 5A:
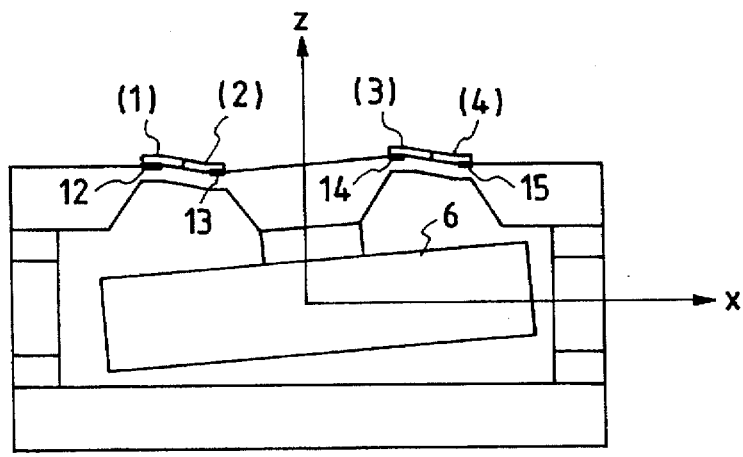
FIGS. 5A and 5B are diagrams for explaining the displacement that is produced by acceleration in the x-axis direction of the acceleration and angular velocity detector according to the first embodiment of the present invention.
Figure 5B:
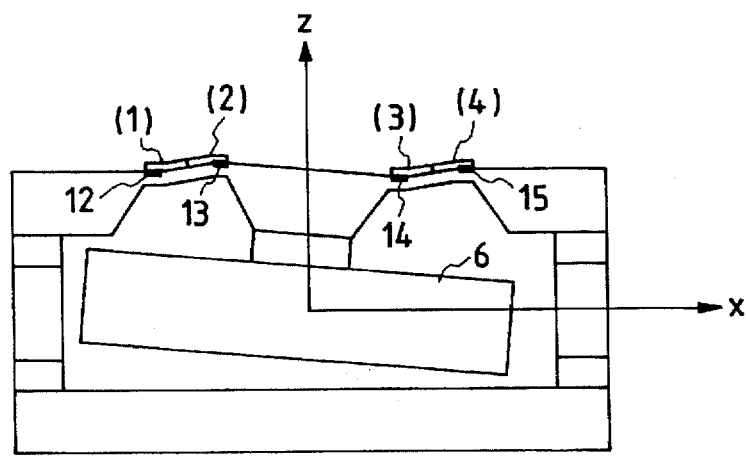
Figure 6A:
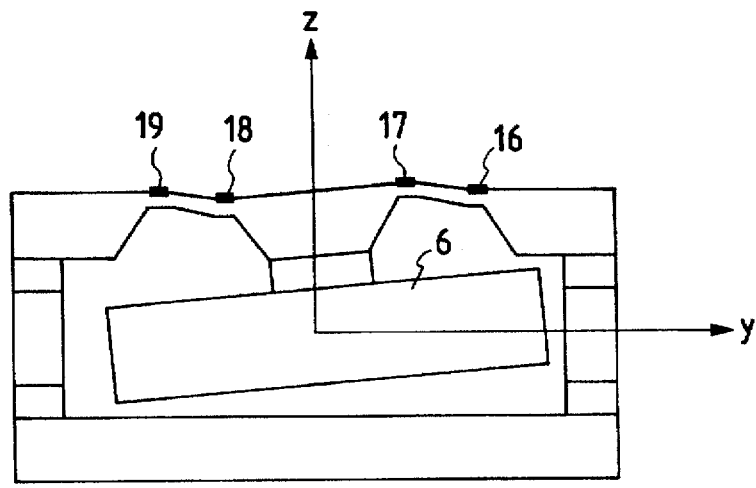
FIGS. 6A and 6B are diagrams for explaining the displacement that is produced by the acceleration in the y-axis direction of the acceleration and angular velocity detector according to the first embodiment of the present invention.
Figure 6B:
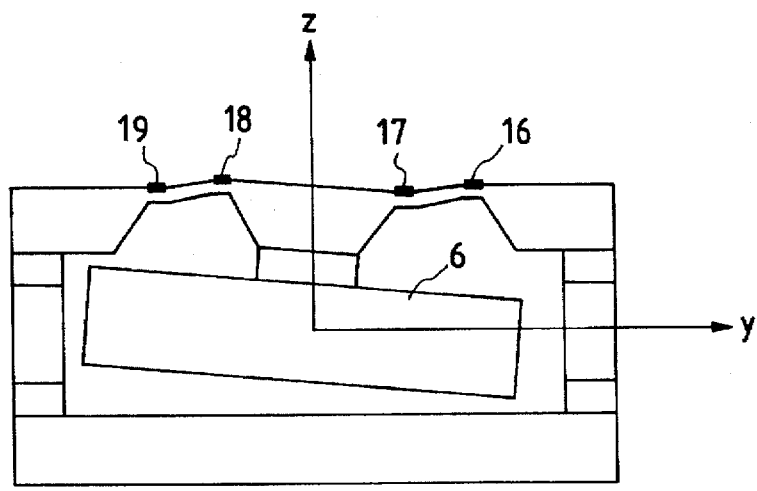
Figure 7A:
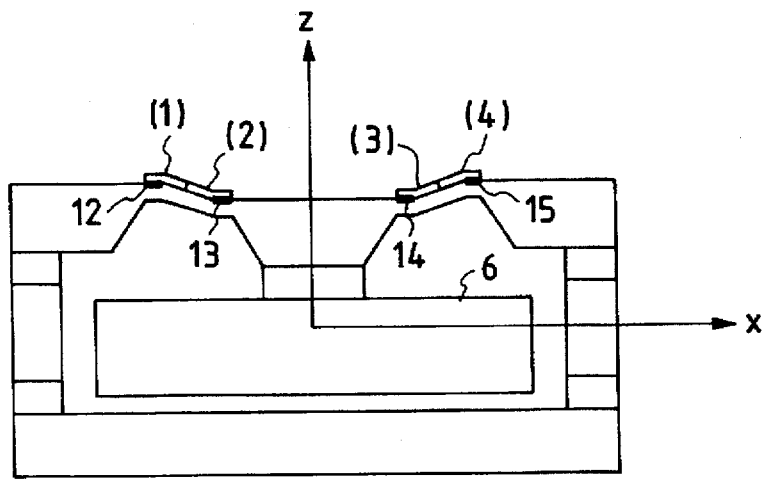
FIGS. 7A and 7B are diagrams for explaining the displacement that is produced by the acceleration in the z-axis direction of the acceleration and angular velocity detector according to the first embodiment of the present invention.
Figure 7B:
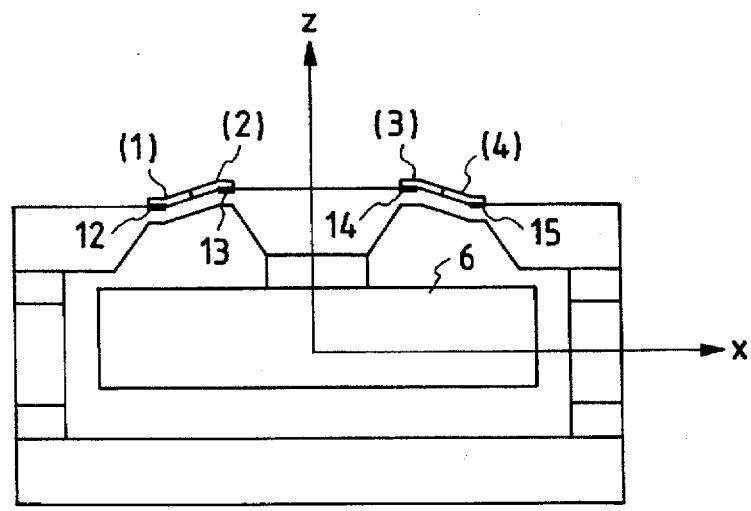

First, the relationship between the acceleration and the displacement of the body mass 6 will be explained while referring to FIGS. 5A through 7B. When acceleration $-a_x$ in the negative x-axis direction is generated in the detector, inertial force $f_x=ma_x$ occurs in the x-axis direction, and thus, the body mass 6 is displaced in the positive x-axis direction (FIG. 5A). It should be noted that m denotes the weight of the mass portion and a is the rate of the acceleration. Likewise, when the acceleration $a_x$ in the positive x-axis direction is generated, inertial force $f_x=-ma_x$ occurs in the x-axis direction, the body mass 6 is displaced in the negative x-axis direction (FIG. 5B). In the same manner as for the x-axis direction, upon the application of the acceleration in the y-axis direction, the body mass 6 is displaced in the y-axis direction in consonance with the direction and the rate of the acceleration (FIGS. 6A and 6B). When acceleration $a_z$ is generated in the detector in the z-axis direction, inertial force $f_z=-ma_z$ occurs in the negative z-axis direction, and thus the body mass 6 is displaced in the negative z-axis direction (FIG. 7A). Further, when acceleration $-a_z$ is generated in the detector in the negative z-axis direction, inertial force $f_z=ma_z$ occurs in the z-axis direction, and thus the body mass 6 is displaced in the positive z-axis direction (FIG. 7B).

Figure 2A:
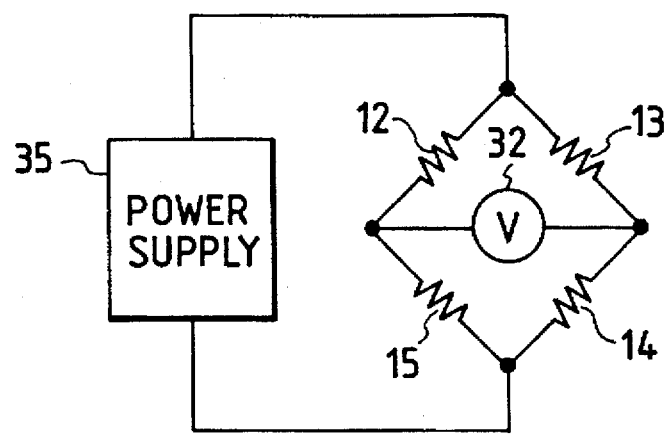
FIGS. 2A through 2C are schematic diagrams illustrating the arrangements of bridge circuits for resistors in the acceleration and angular velocity detector according to the first embodiment of the present invention.
Figure 2B:
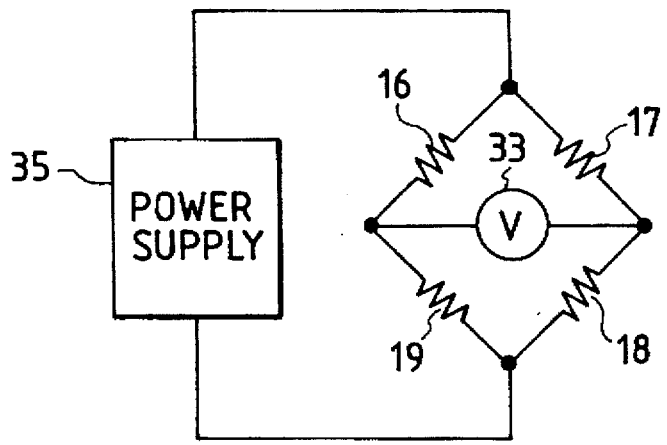
Figure 2C:
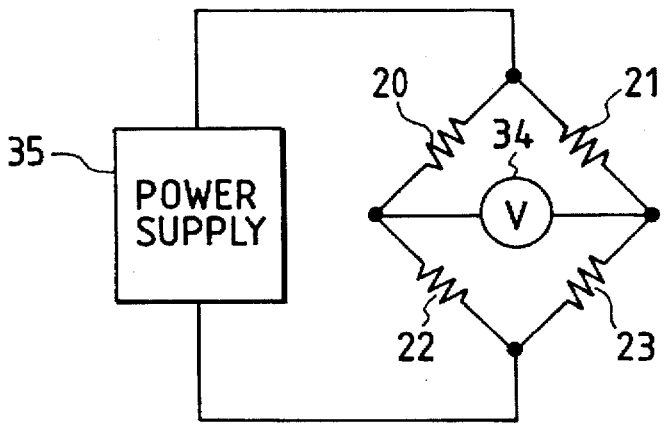

Since the resistor element groups, which detect the displacement values for the body mass 6 in the x-, y- and z-axes directions, are designed as bridge circuits as is shown in FIGS. 2A, 2B and 2C, the output of a voltage meter 34 of the bridge circuit in FIG. 2C, which detects the displacement of the body mass 6 in the z-axis direction, does not change, while the body mass 6 is displaced in either the x- or the y-axis direction. Further, since the x-axis and the y-axis intersect perpendicularly, the flexible portion 2 is uniformly displaced in the y-axis direction even when the body mass 6 is displaced in the x-axis direction. Therefore, the output of a voltage meter 33 in the bridge circuit in FIG. 2B, which detects the displacement of the body mass 6 in the y-axis direction, does not change. Likewise, when the body mass 6 is displaced in the y-axis direction, the output of a voltage meter 32 in the bridge circuit in FIG. 2A, which detects the displacement of the body mass 6 in the x-axis direction, does not change. The displacement of the body mass 6 in the x-, y- and z-axes directions can be independently detected for each direction.

The relationship between an angular velocity and the displacement of the body mass 6 will now be described while referring to FIGS. 8A through 10B. As is described above, the body mass 6 is vibrated by the vibration means in the x- and z-axes directions (circularly across the x-z plane).

Figure 8A:
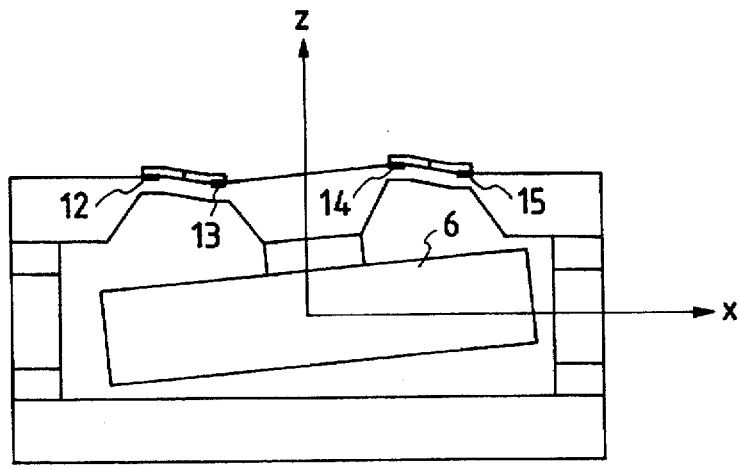
FIGS. 8A and 8B are diagrams for explaining the displacement that is produced by the angular velocity in the y-axis direction of the acceleration and angular velocity detector according to the first embodiment of the present invention.
Figure 8B:
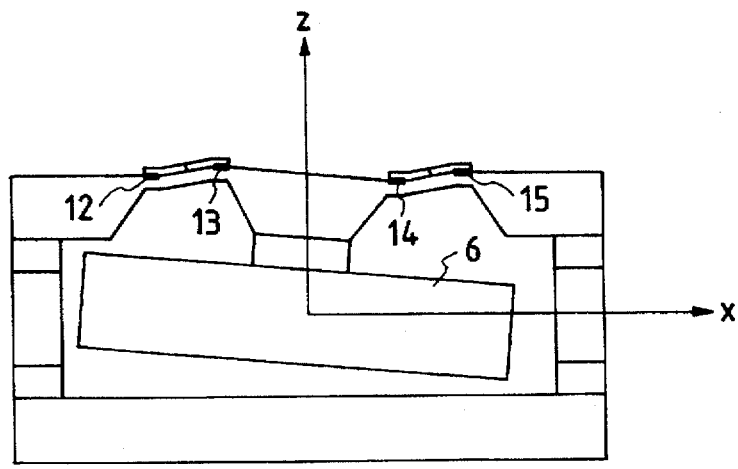
Figure 9A:
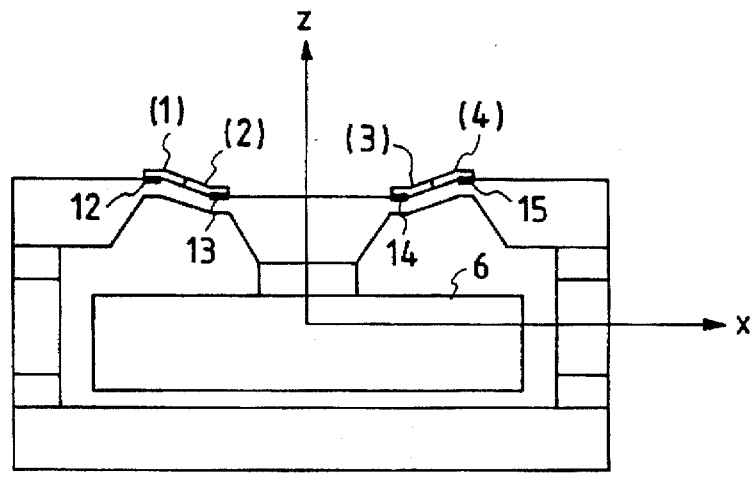
FIGS. 9A and 9B are diagrams for explaining the displacement that is produced by the angular velocity in the y-axis direction of the acceleration and angular velocity detector according to the first embodiment of the present invention.
Figure 9B:
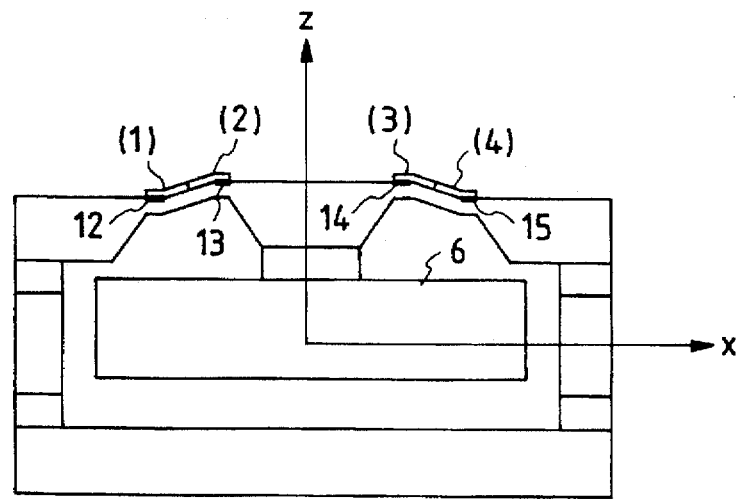

When angular velocity $\omega_y$ around the y-axis is generated in the acceleration and the angular velocity detector, as the body mass 6 is vibrated in the z-axis direction, the Coriolis force $R_x = -2m\omega_y v_z$ occurs in the x-axis direction, and the body mass 6 is displaced in the x-axis direction, as is shown in FIGS. 8A and 8B. It should be noted that m denotes the mass of the mass portion and $v_z$ denotes the velocity of the mass portion in the z-axis direction. The Coriolis force $R_x$ that occurs in the x-axis direction is also changed in consonance with $v_z$, and the body mass 6 vibrates in the x-axis direction. The amplitude of the vibration is proportional to the angular velocity $\omega_y$. At this time, since the body mass 6 is also vibrating in the x-axis direction, the Coriolis force $R_z = -2m\omega_y v_x$ is also exerted on the body mass 6 in the z-axis direction by the angular velocity $\omega_y$ around the y-axis, so that the body mass 6 is displaced as is shown in FIGS. 9A and 9B. The Coriolis force $R_z$ that occurs in the x-axis direction is changed in consonance with $v_x$ in the same manner as is the Coriolis force $R_x$ that occurs in the x-axis direction, and the body mass 6 vibrates in the z-axis direction. The amplitude of the vibration is proportional to the angular velocity $\omega_y$.

Likewise, when the angular velocity $\omega_x$ around the x-axis and as the body mass 6 is vibrating in the z-axis direction, the Coriolis force $R_y = -2m\omega_x v_z$ acts on the body mass 6 in the y-axis direction. The body mass 6 thus vibrates in the y-axis direction, as is shown in FIGS. 10A and 10B.

Figure 10A:
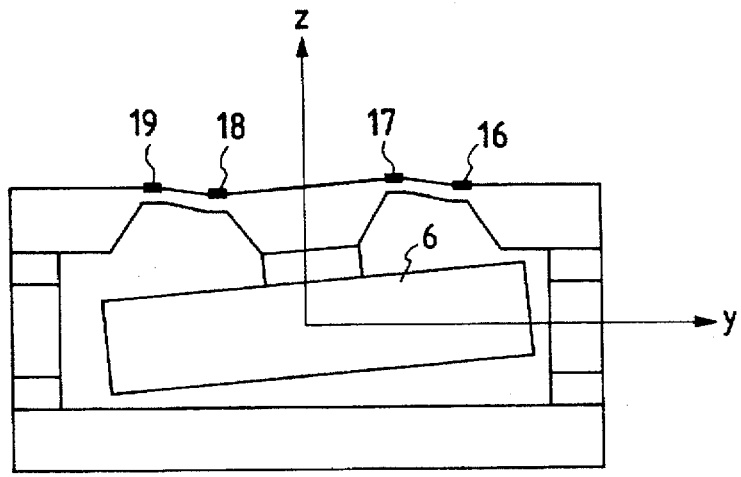
FIGS. 10A and 10B are diagrams for explaining the displacement that is produced by the angular velocities in the x- and z-axes directions of the acceleration and angular velocity detector according to the first embodiment of the present invention.
Figure 10B:
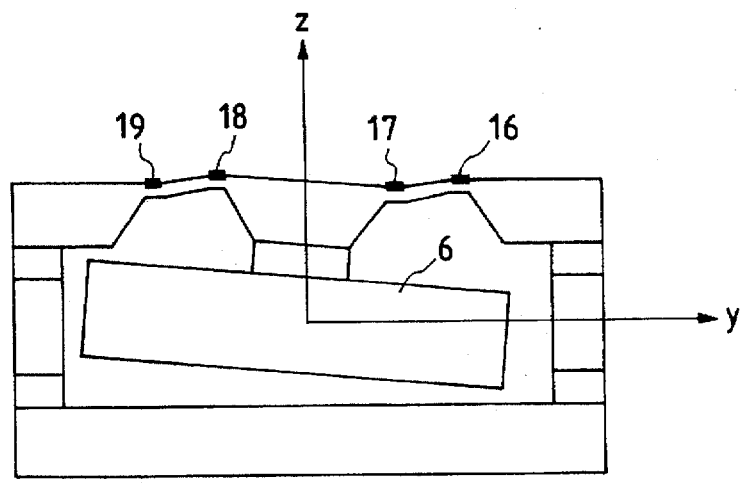

When angular velocity $\omega_z$ around the z-axis is generated and at the same time as velocity $v_x$ of the body mass 6 in the x-axis direction, the Coriolis force $R_y = -2m\omega_z v_x$ occurs in the y-axis direction and the body mass 6 is displaced in the y-axis direction, as is shown in FIGS. 10A and 10B. The direction in which the body mass 6 is displaced varies depending on the direction of the angular velocity, as is shown in FIGS. 10A and 10B. Since the body mass 6 is vibrating and thus the velocity $v_x$ in the x-axis direction is changed, the Coriolis force $R_y$ is accordingly altered in consonance with $v_x$. The body mass 6 therefore vibrates in the y-axis direction. The amplitude of the vibration is proportional to the angular velocity $\omega_z$.

Next, the relationship between the displacement of the body mass 6 and the resistance change will be explained. The change at the resistor elements 12 through 23 depends on the degree of the deformation of the flexible portion 2. The flexible portion 2 is deformed in consonance with the displacement value of the body mass 6. When, for example, the body mass 6 is displaced in the z-axis direction, as is shown in FIGS. 7A and 7B, and the body mass 6 is in the state shown in FIG. 7A, the resistances of the resistor elements 12 and 15 are increased, while the resistances of the resistor elements 13 and 14 are reduced. This is because the resistor elements 12 and 15 of the flexible portion are expanded and the resistor elements 13 and 14 are contracted. On the contrary, when the body mass 6 is in the state in FIG. 7B, the resistances of the resistor elements 12 and 15 are reduced and the resistances of the resistor elements 13 and 14 are increased. Since the flexible portion 2 is deformed, as is shown in FIGS. 7A and 7B, at the time of the displacement of the body mass 6 in the z-axis direction, the resistances of the resistor elements 12, 15, 16, 19, 20, 23 are almost the same, and the resistances of the resistor elements 13, 14, 17, 18, 21 and 22 are almost the same. As the resistor elements 12 through 23 are designed as bridge circuits, as is shown in FIGS. 2A through 2C, among the voltage meters that are provided in the bridge circuits only the voltage meter 34 in FIG. 2C has its output altered.

The displacement of the body mass 6 in the y-axis direction, as is shown in FIGS. 6A and 6B, will now be explained. When the body mass 6 is displaced as is shown in FIG. 6A, the resistances of the resistor elements 17 and 19 are increased and the resistances of the resistor elements 16 and 18 are reduced. When the body mass 6 is displaced as is shown in FIG. 6B, the resistances of the resistor elements 17 and 19 are reduced and the resistances of the resistor elements 16 and 18 are increased. The reason for the variations in the resistances of the resistor elements is that, as is described above, distortion occurs in the resistor elements. When the resistances of the resistor elements 16, 17, 18 and 19 are varied in this manner, the resistances of the resistor elements 20, 21, 22, 23 for the detection of the displacement of the body mass 6 in the z-axis direction are also changed. Since the resistor elements 16 through 23 are designed as bridge circuits, as is shown in FIGS. 2B and 2C, the output of the voltage meter 34 in FIG. 2C is not changed, and only the output of the voltage meter 33 in FIG. 2B is altered. At this time, since the distortion of the resistor elements 12 through 15 is constant along the x-axis that is perpendicular to the y-axis, the resistances of the resistor elements 12 through 15 are constant, and the output of the voltage meter 32 is not changed. The condition that exist when the body mass 6 is displaced in the x-axis direction as is shown in FIGS. 5A and 5B is the same as when the body mass 6 is displaced in the y-axis direction. More specifically, when the body mass 6 is displaced as is shown in FIG. 5A, the resistances of the resistor elements 12 and 14 are increased and the resistances of the resistor elements 13 and 15 are reduced. When the body mass 6 is displaced as is shown in FIG. 5B, the resistances of the resistor elements 12 and 14 are reduced and the resistances of the resistor elements 13 and 15 are increased. As is described above, the displacement of the body mass 6 in the x-axis direction can be detected by the change in the output of the voltage meter 32 of the bridge circuit in FIG. 2A.

The displacements of the body mass 6 in the x-, y- and z-axes directions can be independently detected in the above described manner from the outputs of the voltage meters 32, 33 and 34 of the bridge circuits in FIGS. 2A through 2C. The displacement of the body mass 6 in the x-axis direction is the sum of the vibration, which is caused by the vibration means, and the displacement, which is due to the acceleration in the x-axis direction and the angular velocity around the y-axis. The displacement of the body mass 6 in the y-axis direction is the sum of the displacement, which is caused by the angular velocities around the x- and z-axes, and the displacement, which is due to the acceleration in the y-axis direction. The displacement of the body mass 6 in the z-axis direction is the sum of the displacement, which is caused by the acceleration in the z-axis direction and the vibration of the vibration means, and the displacement, which is due to the angular velocity around the y-axis. It should be noted that the displacement caused by the angular velocity is the displacement that is due to the Coriolis force which is exerted by the angular velocity. It is therefore necessary to detect independently which of the three factors causes the displacement of the body mass 6, the acceleration, the angular velocity, or the vibration by the vibration means.

The processing method for signals (which indicate the displacement of the body mass 6) that are output by the voltage meters 32, 33 and 34 will therefore be explained.

Figure 11:
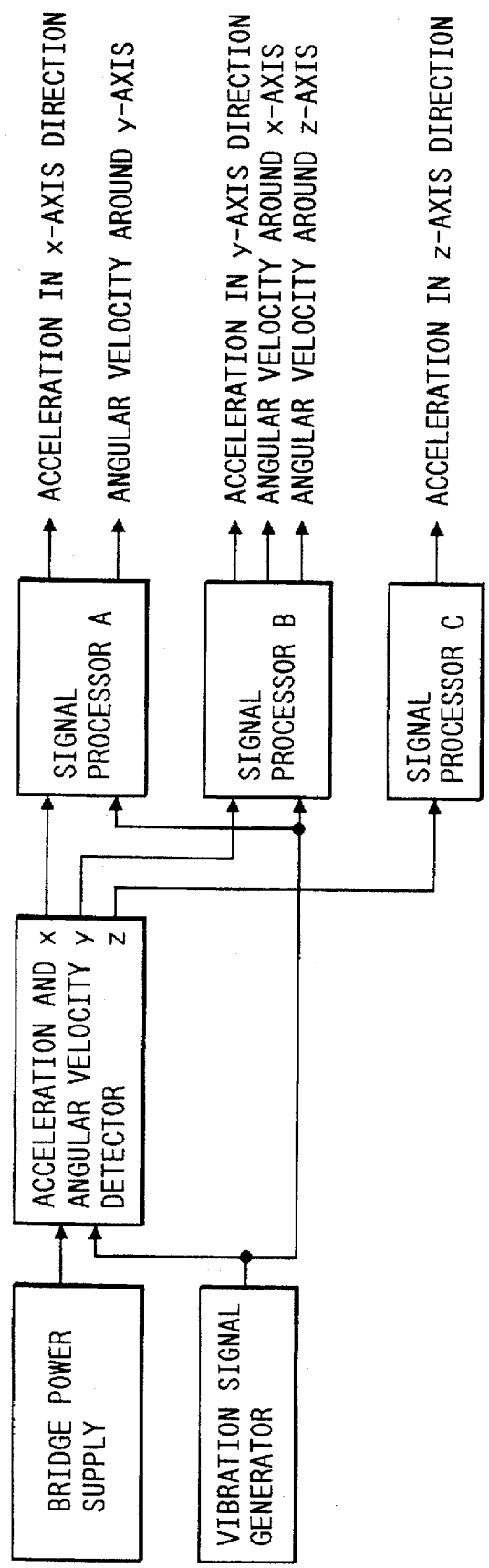
FIG. 11 is a block diagram for explaining the processing of a signal that is generated upon the displacement of the body mass according to the first embodiment of the present invention.

FIG. 11 is a diagram showing the signal processing method for the detector.

Figure 14:
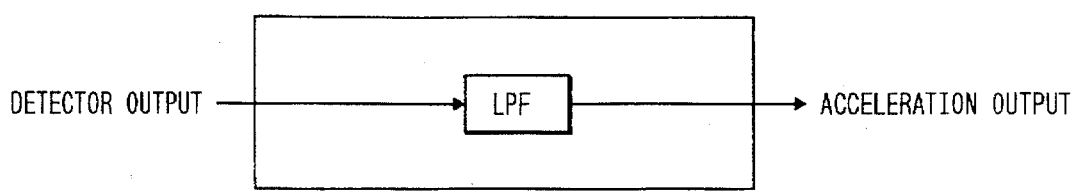
FIG. 14 is a schematic diagram illustrating the arrangement of a signal processor C according to the first embodiment of the present invention.

The displacement of the body mass 6 in the z-axis direction is the sum of the displacement, which occurs due to the vibration caused by the vibration means, and the displacement, which is due to the Coriolis force in the z-axis direction due to the angular velocity around the y-axis. When a vibration frequency (a frequency at which the body mass 6 is vibrated by the vibration means) is set so that it is sufficiently higher than the frequency for the acceleration that is to be measured, an output signal is transmitted to a signal processor C, i.e., a low-pass filter (LPF) shown in FIG. 14, where vibration elements are eliminated and only an acceleration signal in the z-axis direction can thus be provided.

Figure 12:
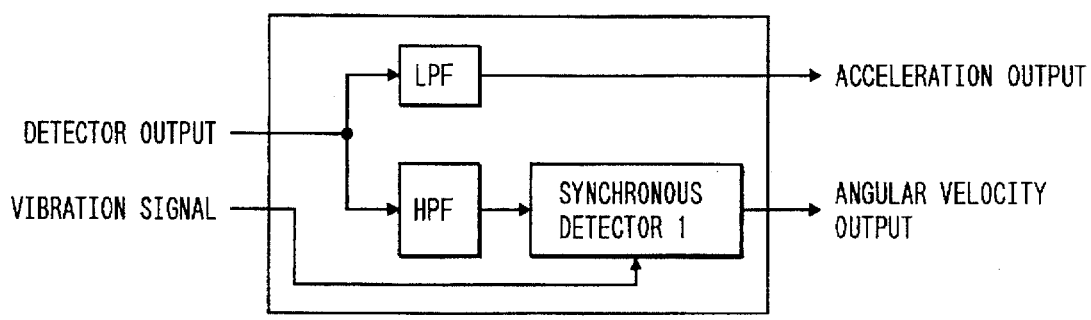
FIG. 12 is a schematic diagram illustrating the arrangement of a signal processor A according to the first embodiment of the present invention.

The displacement of the body mass 6 in the x-axis direction is the sum of the displacement that is due to the Coriolis force in the x-axis direction that is exerted as a result of the angular velocity around the y-axis, the displacement that is due to the acceleration in the x-axis direction, and the displacement that is caused by the vibration means. It is apparent that the frequency for the displacement that is caused by the Coriolis force matches the vibration frequency. When the vibration frequency is set much higher than the acceleration and the angular velocity is to be measured, as is shown in FIG. 12, an output signal is transmitted to a low-pass filter (LPF) where vibration elements due to the vibration means and vibration elements attributed to the Coriolis force are eliminated, and only an acceleration signal for the x-axis can be thus provided. In addition, after the output signal is transmitted through a high-pass filter (HPF) where an acceleration signal is removed, the displacement speed of the body mass 6 in the z-axis direction and a phase are matched at the vibration frequency and synchronous detection is performed. As a result, a Coriolis force signal can be detected. As is described above, since the signal for the Coriolis force is proportional to a signal for the angular velocity, the angular velocity around the y-axis can be calculated by using the signal for the Coriolis force.

Figure 13:
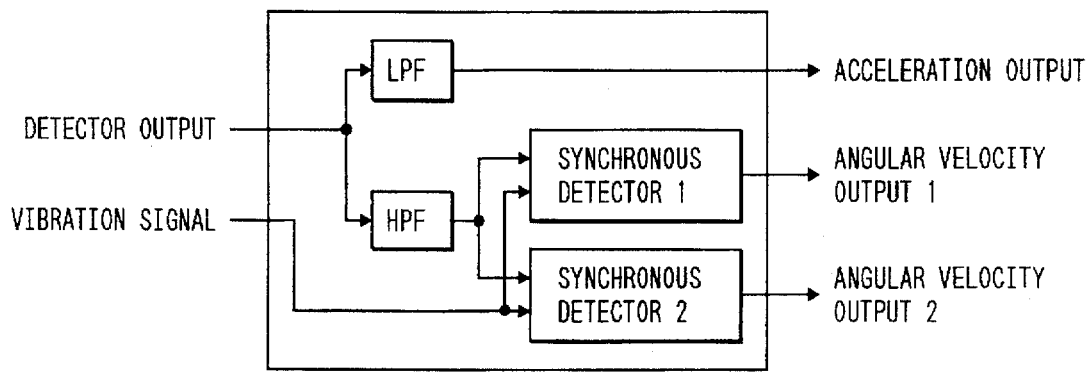
FIG. 13 is a schematic diagram illustrating the arrangement of a signal processor B according to the first embodiment of the present invention.

The displacement of the body mass 6 in the y-axis direction is the sum of the displacement that is due to the Coriolis force in the y-axis direction that is generated by the angular velocity around the x-axis, the displacement that occurs due to the Coriolis force in the y-axis direction that is generated by the angular velocity around the z-axis, and the displacement that is due to the acceleration in the y-axis direction. It is apparent that the frequency for the displacement that is due to the Coriolis force matches the vibration frequency. Since the body mass 6 is vibrated two dimensionally, and $v_z$ and $v_x$ differ in their phases, a phase difference also appears between the signals for the Coriolis force that is generated by the angular velocity around the x-axis, and the signals for the Coriolis force that is generated by the angular velocity around the z-axis. Thus, to detect independently the two kinds of Coriolis forces, synchronous detection is performed by referring to the timing for a vibration signal. When the vibration frequency is set much higher than the acceleration and the angular velocity that is to be measured, as is shown in FIG. 13, an output signal is transmitted to a low-pass filter (LPF) where vibration elements produced by the Coriolis force are eliminated and only an acceleration signal for the x-axis can be thus provided. In addition, after the output signal is transmitted through a high-pass filter (HPF) where an acceleration signal is removed, synchronous detection at the vibration frequency can provide two types of Coriolis force signals, and with these signals, the angular velocities around the x- and z-axes can be acquired. In the first embodiment, a frequency for the acceleration and the angular velocity that are to be measured is 1 through 30 Hz, and a frequency for vibrations of the body mass 6 in the x- and z-axes directions is 2 KHz.

If the body mass 6 is vibrated in the z-axis direction in the vicinity of a resonance point of the section that includes the body mass 6 and the flexible portion 2, the amplitude of the body mass 6 in the z-axis direction is increased and the speed of the body mass 6 becomes higher. Then, as the Coriolis force that acts on the body mass 6 is accordingly increased, a strong output signal can thus be acquired.

If the body mass 6 is vibrated in the x- and/or the y-axis direction in the vicinity of a resonance point of the section that includes the body mass 6 and the flexible portion 2, the displacement of the body mass 6 in the x- and/or the y-axis direction, which occurs due to the Coriolis force that equals the vibration frequency, is increased, and a strong output signal can be acquired.

In the first embodiment, the body mass 6 has been vibrated across the x-z plane. However, when the body mass 6 is vibrated across the y-z plane, the acceleration in the three axes directions and the angular velocities around the three axes can be detected in the same manner. Although the four piezoelectric element groups are arranged along the x-axis in FIG. 1A, four other piezoelectric pairs may also be arranged along the y-axis to vibrate the body mass 6 across the x-y plane and to detect the acceleration in the three axes directions and the angular velocities around the three axes.

In the first embodiment, the body mass 6 is vibrated across the x-z plane. At this time, it is necessary that the body mass 6 have vibration elements only in the x- and z-axes directions, and that the phase of a vibration frequency in the x-axis direction be different from that of a vibration frequency in the z-axis direction. The amplitudes of their vibrations need not be equal.

Figure 15A:
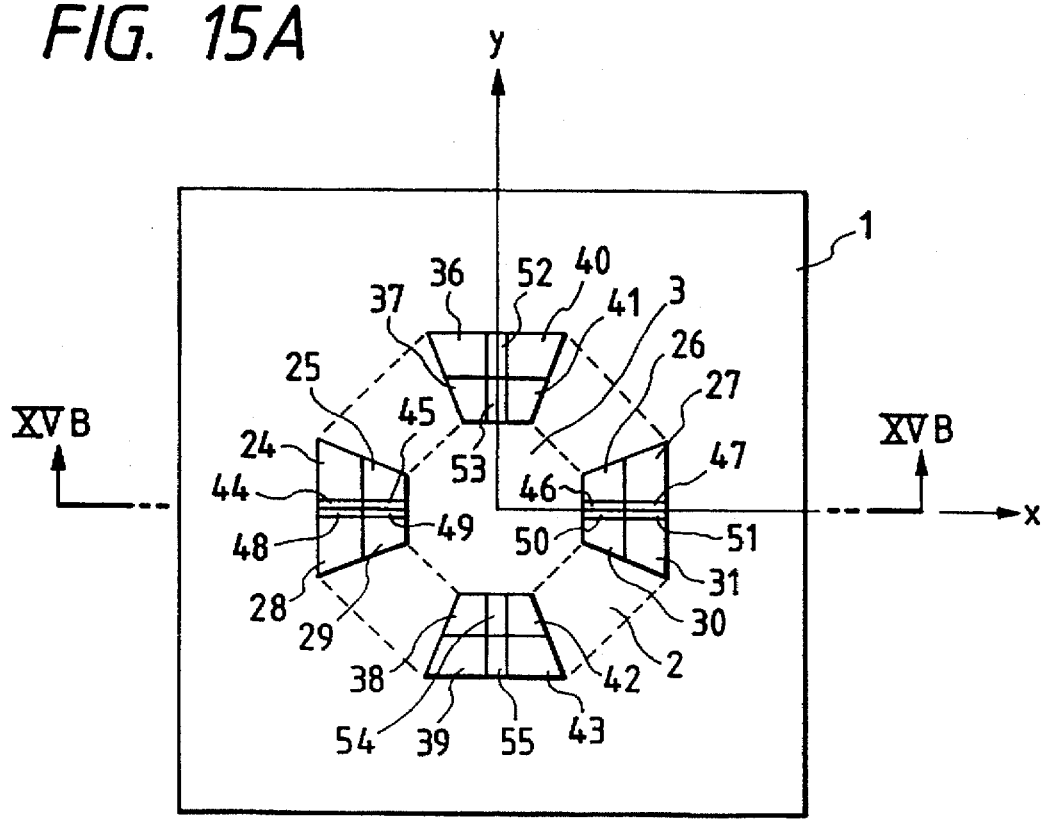
FIG. 15A is a schematic top view illustrating an acceleration and angular velocity detector according to a second embodiment of the present invention.
Figure 15B:
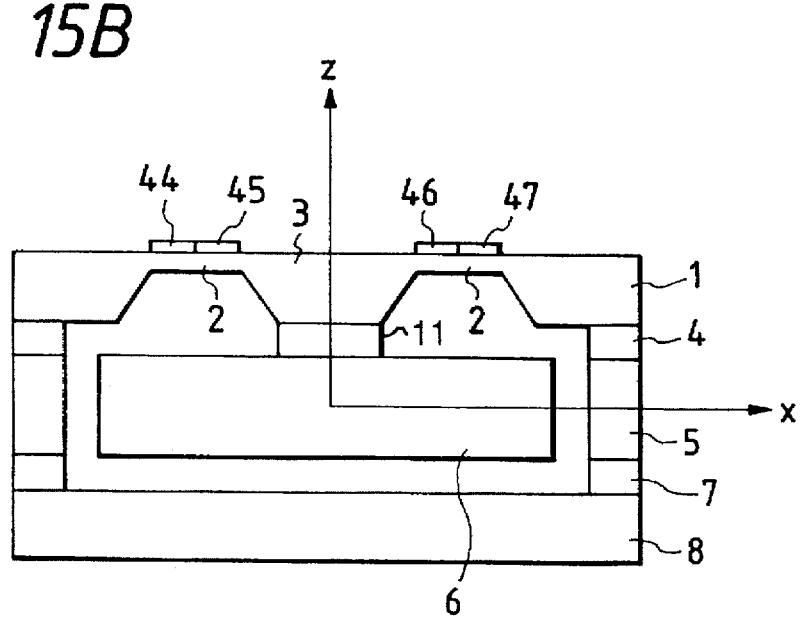
FIG. 15B is a cross sectional view of the acceleration and angular velocity detector taken along line XVB—XVB in FIG. 15A.

FIG. 15A is a schematic top view of an acceleration and angular velocity detector according to a second embodiment of the present invention. FIG. 15B is a cross sectional view of the detector taken along line XVB—XVB in FIG. 15A.

Compared with the acceleration and angular velocity detector in the first embodiment, the acceleration and angular velocity detector in the second embodiment features a body mass that is vibrated two dimensionally not across the x-z plane but across the x-y plane and the employment of piezoelectric elements, instead of resistor elements, for detecting the displacement of the body mass in three axes directions. Since the remaining arrangements of the second embodiment are the same as those of the first embodiment, the same reference numbers as are used in the first embodiment are used in the second embodiment to denote corresponding or identical components, and no explanation for them will be given.

The acceleration and angular velocity detector in the second embodiment includes piezoelectric elements 24 through 31 and 36 through 43 for vibrating a body mass 6, and piezoelectric elements 44 through 55 for detecting the displacement of the body mass 6.

Figure 16:
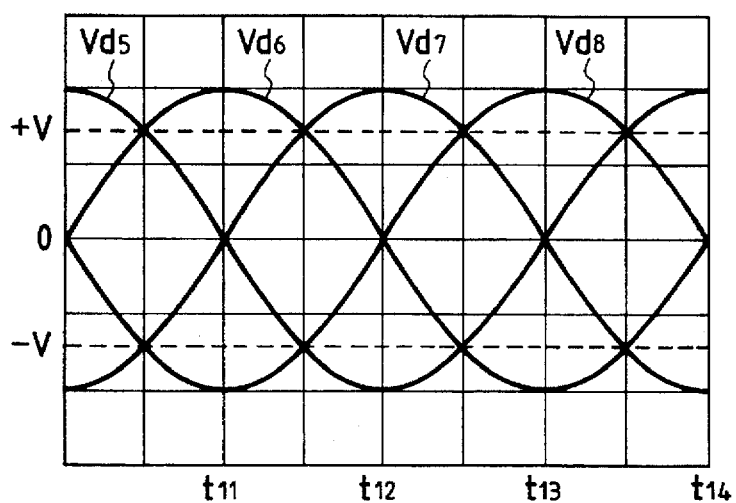
FIG. 16 is a graph showing a waveform for a voltage that is applied to a piezoelectric element in the acceleration and angular velocity detector according to a second embodiment of the present invention.
Figure 17A:
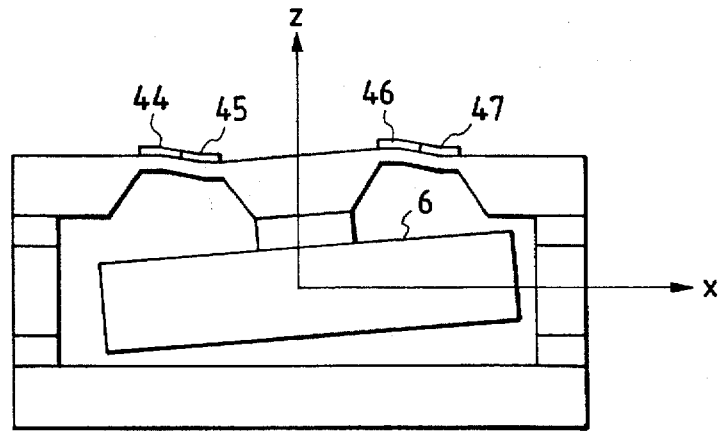
FIGS. 17A and 17B are diagrams for explaining the state of a body mass in the acceleration and angular velocity detector when it is subjected to vibration according to the second embodiment of the present invention.
Figure 17B:
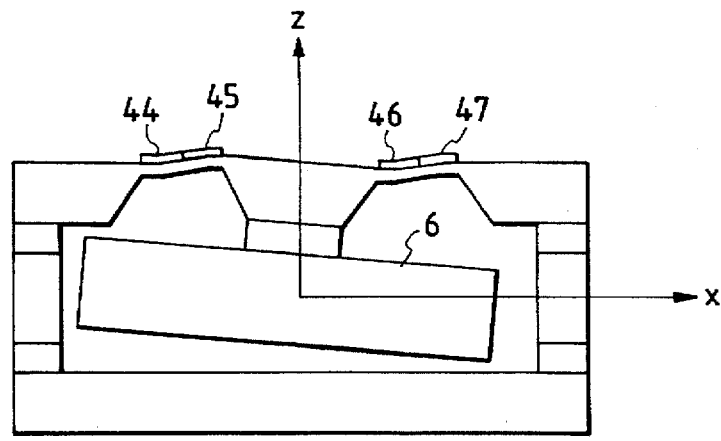
Figure 18A:
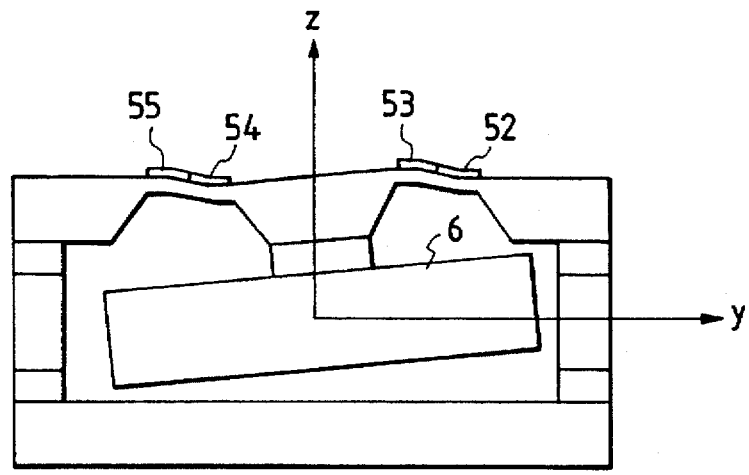
FIGS. 18A and 18B are diagrams for explaining the state of the body mass in the acceleration and angular velocity detector when it is subjected vibration according to the second embodiment of the present invention.
Figure 18B:
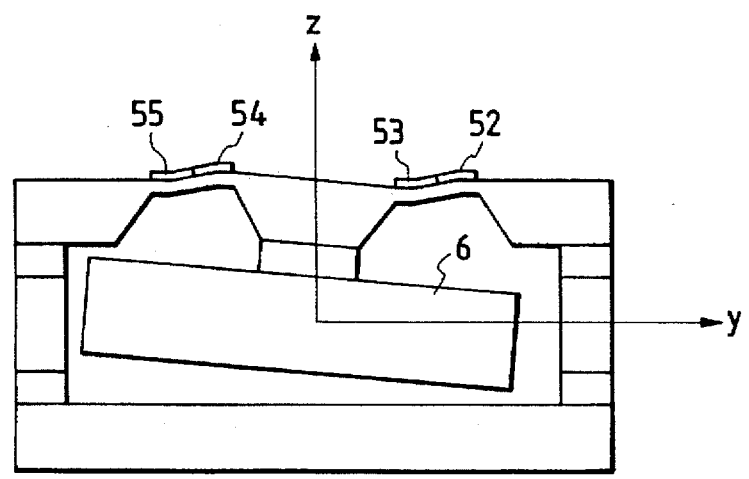

As in the first embodiment, the piezoelectric elements 24 through 31 have upper and lower electrodes on their upper and lower surfaces. The piezoelectric elements 36 through 43, as well as the piezoelectric elements 24 through 31, have upper and lower electrodes on their upper and lower surfaces. Further, as in the first embodiment, since a voltage is applied to the paired piezoelectric elements 24 and 28, 25 and 29, 26 and 30, and 27 and 31, the individual pairs are called piezoelectric element pairs (1), (2), (3) and (4) as in the first embodiment. In addition, since a voltage is applied to the paired piezoelectric elements 36 and 40, 37 and 41, 38 and 42, and 39 and 43, the individual pairs are called piezoelectric element pairs (5), (6), (7) and (8). The piezoelectric element pairs (1) through (4) vibrate the body mass 6 in the x-axis direction, and the piezoelectric element pairs (5) through (8) vibrate the body mass 6 in the y-axis direction. As a result, the body mass 6 can be vibrated circularly across the x-y plane at almost the center of the central thick portion 3. FIG. 16 is a graph showing the waves of the voltages that are applied at this time to the piezoelectric element pairs (1) through (8). The vertical axis in FIG. 16 indicates a voltage value and the horizontal axis indicates time. The waves for the individual applied voltages are represented by $V_{d5}$, $V_{d6}$, $V_{d7}$ and $V_{d8}$, with $V_{d5}$ representing the wave of a voltage that is applied to the piezoelectric element pairs (2) and (4), $V_{d6}$ representing the wave of a voltage that is applied to the piezoelectric element pairs (5) and (7), $V_{d7}$ representing the wave of a voltage that is applied to the piezoelectric element pairs (1) and (3), and $V_{d8}$ representing the wave of a voltage that is applied to the piezoelectric element pairs (6) and (8). At time $t_{11}$, a voltage is applied to the piezoelectric element pairs (1) through (4) and is not applied to the piezoelectric element pairs (5) through (8), which are arranged in the y-axis direction. At this time, voltage V is applied to the upper electrodes of the piezoelectric element pairs (2) and (4), while −V voltage is applied to the upper electrodes of the piezoelectric element pairs (1) and (3). Therefore, at time $t_{11}$ the body mass 6 is displaced as is shown in FIG. 17B. In the same manner, at time $t_{12}$, the body mass 6 is displaced as is shown in FIG. 18B; at time $t_{13}$, the body mass 6 is displaced as is shown in FIG. 17A; and at time $t_{14}$, the body mass 6 is displaced as is shown in FIG. 18A. In other words, by applying a voltage shown in FIG. 16 to the piezoelectric element pairs (1) through (8), the body mass 6 is vibrated circularly across the x-y plane.

Upon the application of the angular velocity around the x-axis, the body mass 6 is displaced by exerting the Coriolis force in the z-axis direction. Upon the application of the angular velocity around the y-axis, the body mass 6 is displaced by exerting the Coriolis force in the z-axis direction. Upon the application of the angular velocity around the z-axis, the body mass 6 is displaced by exerting the Coriolis force in the x- and z-axes directions.

The detection of the displacement of the body mass 6 will now be explained.

Figure 19A:
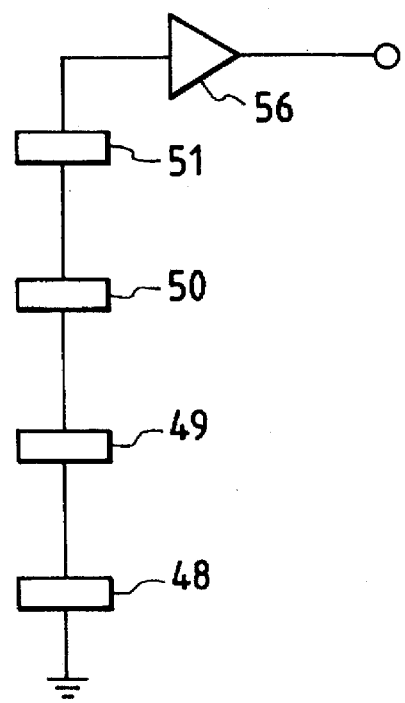
FIGS. 19A and 19B are schematic diagrams illustrating the connection of piezoelectric elements used for detection in the acceleration and angular velocity detector according to the second embodiment of the present invention.
Figure 19B:
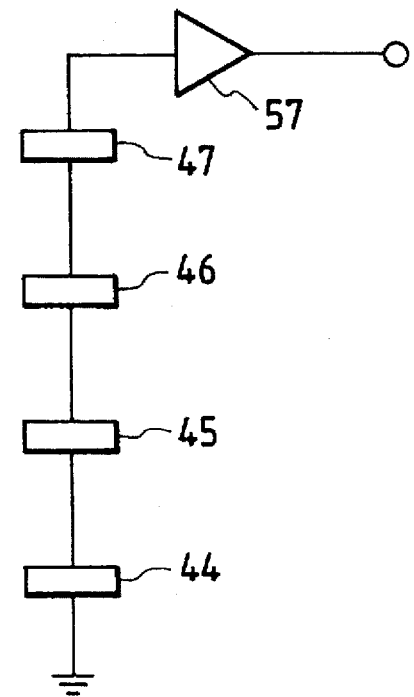

The displacement of the body mass 6 is detected by piezoelectric elements 44 through 55. The piezoelectric elements 44 through 55 as well as the other piezoelectric elements have upper and lower electrodes on their upper and lower surfaces. Those electrodes, however, are so arranged as to be electrically insulated from each other. The piezoelectric elements 44 through 47 are employed for detecting the displacement of the body mass 6 in the x-axis direction, the piezoelectric elements 52 through 55 are employed for detecting the displacement of the body mass 6 in the y-axis direction, and the piezoelectric elements 48 through 51 are employed for detecting the displacement of the body mass 6 in the z-axis direction. The voltages between the upper and the lower electrodes are varied in consonance with the change in the areas of the piezoelectric elements. That is, while in the first embodiment the change in the resistance that is varied in consonance with the displacement of the body mass 6 is detected, in the second embodiment the change of voltage for the piezoelectric elements that is varied in consonance with the displacement of the body mass 6 is detected. Further, in the first embodiment the bridge circuits can be designed that enable the detection of the displacement of the body mass 6 by the resistor elements, but since in the second embodiment the piezoelectric elements are employed and bridge circuits can thus not be provided, the piezoelectric elements are connected as is shown in FIGS. 19A and 19B to detect the displacement of the body mass 6. FIG. 19A is a diagram showing the connection of the piezoelectric elements for detecting the displacement of the body mass 6 in the z-axis direction, and FIG. 19B is a diagram illustrating the connection of the piezoelectric elements for detecting the displacement of the body mass 6 in the x-axis direction.

In FIG. 19A, the piezoelectric elements 48 through 51 are connected together. In this arrangement, the lower electrode of the piezoelectric element 48 is grounded, its upper electrode is connected to the upper electrode of the piezoelectric element 49, the lower electrode of the piezoelectric element 49 is connected to the upper electrode of the piezoelectric element 50, the lower electrode of the piezoelectric element 50 is connected to the lower electrode of the piezoelectric element 51, and the upper electrode of the piezoelectric element 51 is connected to a buffer amplifier 56. With this arrangement, only the displacement of the body mass 6 in the z-axis direction can be detected by the output of the buffer amplifier 56. In FIG. 19B, the piezoelectric elements 44 through 47 are connected together. In this arrangement, the lower electrode of the piezoelectric element 44 is grounded, its upper electrode is connected to the upper electrode of the piezoelectric element 45, the lower electrode of the piezoelectric element 45 is connected to the lower electrode of the piezoelectric element 46, the upper electrode of the piezoelectric element 46 is connected to the upper electrode of the piezoelectric element 47, and the lower electrode of the piezoelectric element 47 is connected to a buffer amplifier 57. With this arrangement, only the displacement of the body mass 6 in the x-axis direction can be detected by the output of the buffer amplifier 57. The piezoelectric elements 52 through 55 are connected in the same manner as the piezoelectric elements 44 through 47, and with this arrangement, only the displacement of the body mass 6 in the y-axis direction can be detected.

The obtained displacement of the body mass 6 in the x-axis direction is the displacement that occurs due to the acceleration in the x-axis direction, the angular velocity around the z-axis and the vibration of the body mass 6 in the x-axis direction. The obtained displacement of the body mass 6 in the y-axis direction is the displacement that occurs due to the acceleration in the y-axis direction, the angular velocity around the z-axis, and the vibration of the body mass 6 in the y-axis direction. The obtained displacement of the body mass 6 in the z-axis direction is the displacement that occurs due to the acceleration in the z-axis direction, the angular velocity around the x-axis, and the vibration of the body mass 6 in the y-axis direction. Therefore, signals for acceleration and signals for angular velocities must be separated from the signal components for the displacement of the body mass 6 in the x-, y- and z-axes directions. Since these signals can be easily acquired by performing the signal processing as in the first embodiment, an explanation of it will not be given.

Figure 20A:
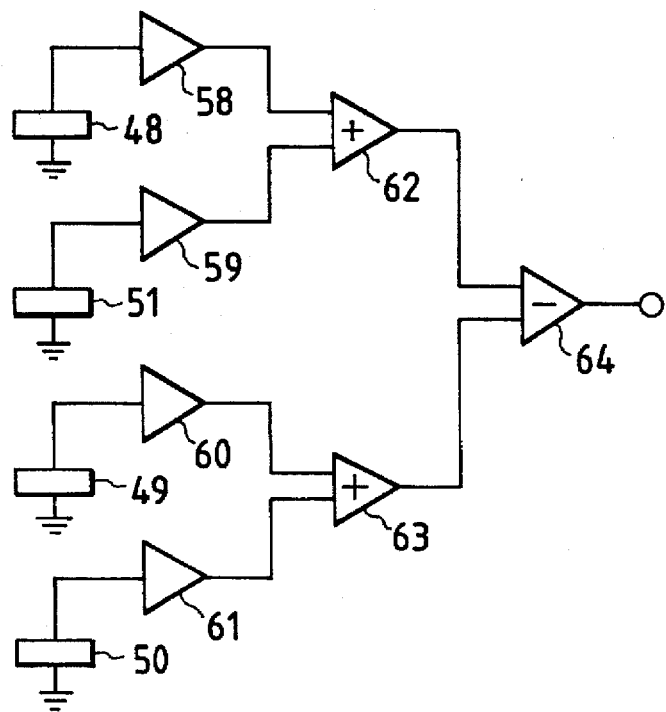
FIGS. 20A and 20B are schematic diagrams illustrating the connection of piezoelectric elements used for detection in the acceleration and angular velocity detector according to the second embodiment of the present invention.
Figure 20B:
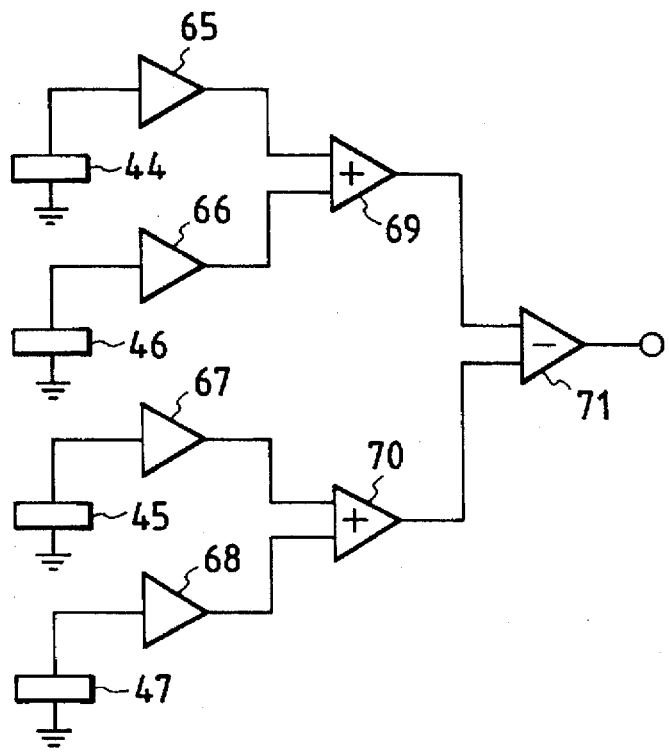

Although, in the second embodiment, the piezoelectric elements for detecting the displacement of the body mass 6 are connected as is shown in FIGS. 19A and 19B, signals that are detected by piezoelectric elements may be extracted and analog adders and subtracters may be employed, as is shown in FIGS. 20A and 20B. It should be noted that in FIGS. 20A and 20B the lower electrodes of the piezoelectric elements are grounded and the signals are output from the upper electrodes. In FIG. 20A, the piezoelectric elements 48 through 51 for detecting the displacement of the body mass 6 in the z-axis direction are connected. The outputs from the upper electrodes of the piezoelectric elements 48 and 51 are passed through respective buffer amplifiers 58 and 59 and are added together by an adder 62. The outputs from the upper electrodes of the piezoelectric elements 49 and 50 are passed through respective buffer amplifiers 60 and 61 and are added together by an adder 63. Then, the output of the adder 63 is subtracted from the output of the adder 62 by a subtracter 64. The output of the subtracter 64 is employed as a signal for the displacement of the body mass 6 in the z-axis direction. In FIG. 20B, the piezoelectric elements 44 through 47 for detecting the displacement of the body mass 6 in the x-axis direction are connected. The outputs from the upper electrodes of the piezoelectric elements 44 and 56 are passed through respective buffer amplifiers 65 and 66 and are added together by an adder 69. The outputs from the upper electrodes of the piezoelectric elements 45 and 47 are passed through respective buffer amplifiers 67 and 68 and are added together by an adder 70. Then, the output of the adder 70 is subtracted from the output of the adder 69 by a subtracter 71. The output of the subtracter 71 is employed as a signal for the displacement of the body mass 6 in the x-axis direction. The piezoelectric elements 52 through 55 for detecting the displacement of the body mass 6 in the y-axis direction are connected in the same manner as are the piezoelectric elements 44 through 47.

In the second embodiment, the body mass 6 is vibrated circularly across the x-y plane for two dimensional vibration. The body mass 6 only needs to include vibration components in the x- and y-axes directions, and is not necessarily vibrated circularly. The body mass 6 may be vibrated not only across the x-y plane but may be vibrated across other planes.

Figure 21A:
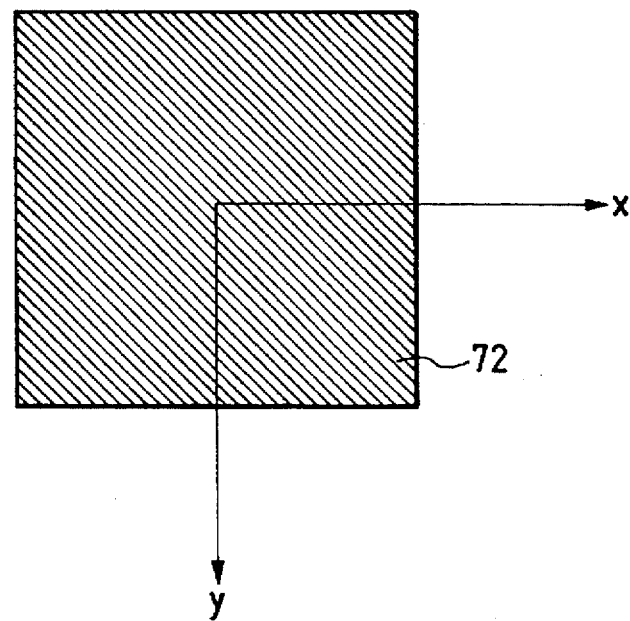
FIGS. 21A and 21B are schematic diagrams illustrating the connection of electrodes, which are used to detect the displacement of the body mass, in the acceleration and angular velocity detector according to the second embodiment of the present invention.
Figure 21B:
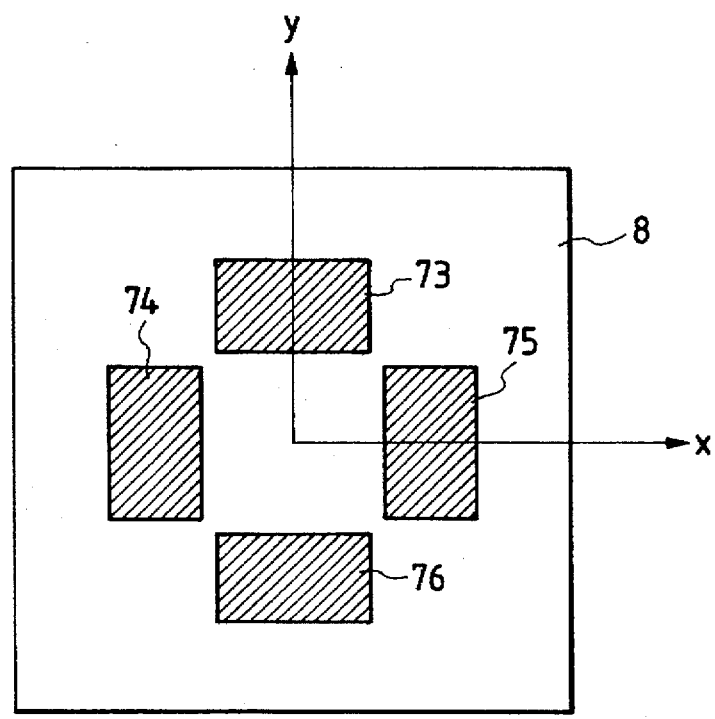
Figure 22:
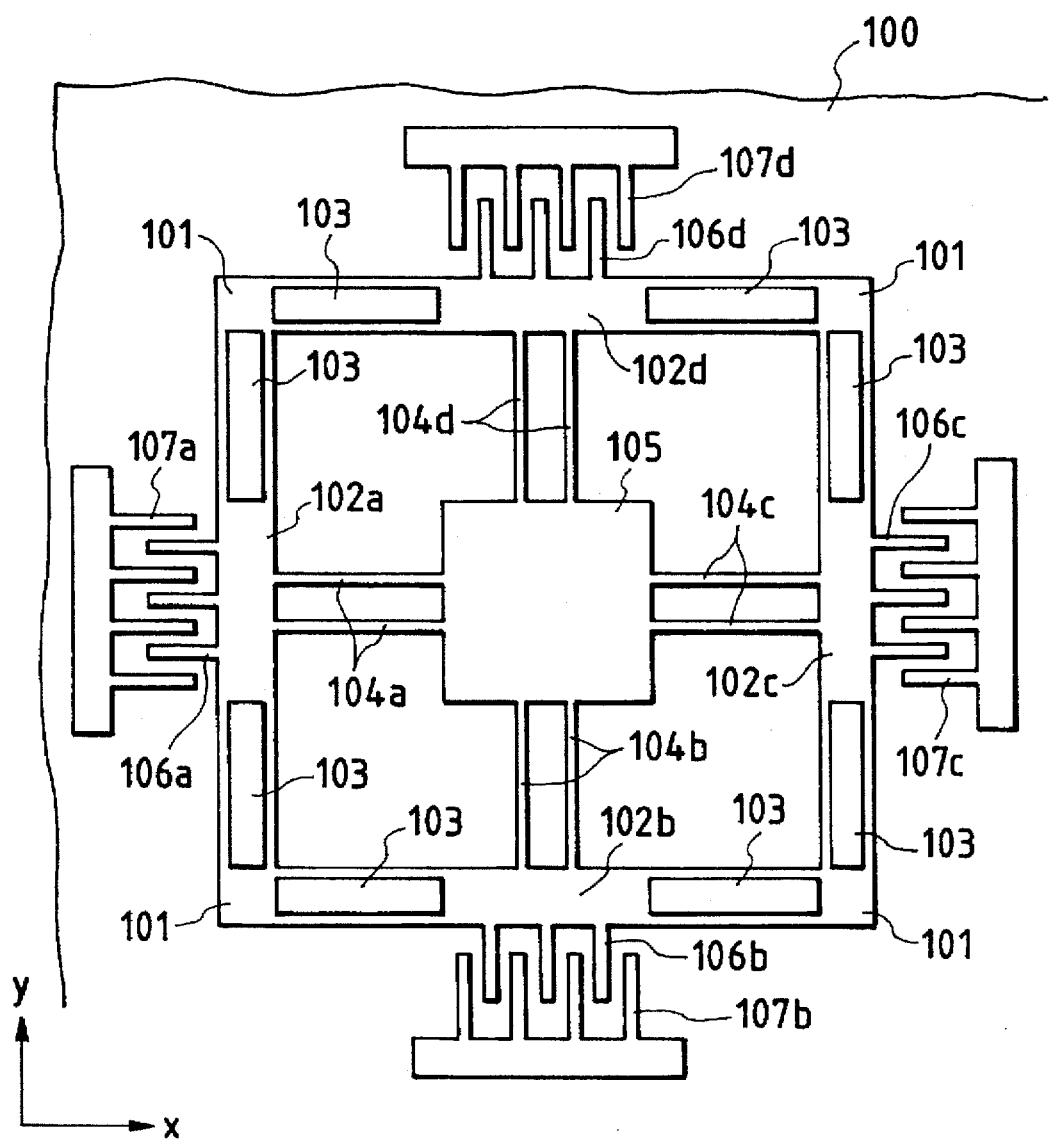
FIG. 22 is a schematic top view of a conventional acceleration and angular velocity detector.

In the first and the second embodiments, in order to detect the displacement of the body mass in the x-, y- and z-axes directions, resistor elements or piezoelectric elements are employed as deformation detection members that detect the degree of deformation of the flexible portion that is bent in consonance with the displacement of the body mass. Other deformation detection members may also be employed, and the displacement of the body mass may also be directly detected. For example, as is shown in FIGS. 21A and 21B, an electrode may be provided on the bottom surface of a body mass 6 and electrodes 73 through 76 may be arranged on the surface opposite to the bottom surface so as to ascertain the displacement of the body mass 6 according to the change in an electric capacity that is detected between the electrode 72 and the four electrodes 73 through 76. More specifically, in a case where the body mass 6 is displaced in the x-axis direction, as is shown in FIGS. 5A and 5B, when the body mass 6 is displaced as shown in FIGS. 5A and 5B, the electric capacity between the electrode 72 and the electrode 74 is increased and the electric capacity between the electrode 72 and the electrode 75 is reduced. On the contrary, when the body mass 6 is displaced as is shown in FIG. 5B, the electric capacity between the electrode 72 and the electrode 74 is reduced and the electric capacity between the electrode 72 and the electrode 75 is increased. Likewise, the displacement of the body mass 6 in the y-axis direction can be detected from the change in the electric capacity between the electrodes 73 and 72 and the change in the electric capacity between the electrodes 76 and 72. The displacement of the body mass 6 in the z-axis direction can be detected from the change in the electric capacity between the electrode 72 and the other four electrodes.

Although, in the first and the second embodiments, the piezoelectric elements are employed to vibrate the body mass two dimensionally, other means may be employed. For example, the entire device may be vibrated two dimensionally.

Any method other than those described in the first and the second embodiments may be employed that is capable of detecting the acceleration and the angular velocities for three axes by employing signals that are output by the acceleration and angular velocity detector.

Therefore, it is intended that the invention not be limited to the preferred embodiments described herein, but that the invention will include all embodiments that fall within the scope of the appended claims.

What is claimed is:

1. An acceleration and angular velocity detector comprising:

a body mass;

a flexible portion, which is connected to said body mass, that deforms in consonance with displacement of said body mass;

a peripheral support member for supporting said flexible portion;

vibration means for vibrating said body mass circularly;

displacement detection means for independently detecting displacements of said body mass in directions of three axes and for outputting a signal; and calculation means for detecting accelerations in said three directions and angular velocities around said three axes by employing said signal output by said displacement detection means.

2. An acceleration and angular velocity detector according to claim 1, wherein said vibration means causes said body mass to vibrate circularly in a plane parallel to a plane of said flexible portion.

3. An acceleration and angular velocity detector according to claim 2, wherein said calculation means includes a signal dividing section, which divides said signal into a signal having a low frequency component and a signal having a high frequency component and outputs said signal having a low frequency component as an acceleration signal, and a synchronous detecting section, which outputs an angular velocity signal based on said signal having a high frequency component and a vibration frequency with which said vibration means vibrates said body mass.

4. An acceleration and angular velocity detector according to claim 3, wherein said displacement detection means includes first, second, and third bridge circuits, said first bridge circuit having, in said flexible portion, a first resistor element group, which includes four resistor elements that are formed along one axis of two intersecting axes, and having a first voltage meter; said second bridge circuit having, in said flexible portion, a second resistor element group, which includes four resistor elements that are formed along the other axis of said two intersecting axes, and having a second voltage meter; and said third bridge circuit having, in said flexible portion, a third resistor element group, which includes four resistor elements that are formed along said other axis of said two intersecting axes, and having a third voltage meter.

5. An acceleration and angular velocity detector according to claim 3, wherein said displacement detection means includes at least four electrodes having equal areas and disposed orthogonally and symmetrically to each other on one of a bottom surface of said body mass and a surface that is positioned opposite to said bottom surface; one electrode, which is formed on the other of said surfaces; and electric capacity detection means for detecting an electric capacity between each of said at least four electrodes and said one electrode.

6. An acceleration and angular velocity detector according to claim 3, wherein said vibration means includes piezoelectric elements that are formed on said flexible portion, and a vibration signal generator for applying an alternating current voltage to said piezoelectric elements.

7. An acceleration and angular velocity detector according to claim 6, wherein said piezoelectric elements are composed of PZT.

8. An acceleration and angular velocity detector according to claim 7, wherein said flexible portion, said body mass, and said peripheral support member are made of silicon.

9. An acceleration and angular velocity detector according to claim 1, wherein said vibration means causes said body mass to vibrate circularly in a plane perpendicular to a plane of said flexible portion.

10. An acceleration and angular velocity detector according to claim 9, wherein said calculation means includes a signal dividing section, which divides said signal into a signal having a low frequency component and a signal having a high frequency component and outputs said signal having a low frequency component as an acceleration signal, and a synchronous detecting section, which outputs an angular velocity signal based on said signal having a high frequency component and a vibration frequency with which said vibration means vibrates said body mass.

11. An acceleration and angular velocity detector according to claim 10, wherein said displacement detection means includes first, second, and third bridge circuits, said first bridge circuit having, in said flexible portion, a first resistor element group, which includes four resistor elements that are formed along one axis of two intersecting axes, and having a first voltage meter; said second bridge circuit having, in said flexible portion, a second resistor element group, which includes four resistor elements that are formed along the other axis of said two intersecting axes, and having a second voltage meter; and said third bridge circuit having, in said flexible portion, a third resistor element group, which includes four resistor elements that are formed along said other axis of said two intersecting axes, and having a third voltage meter.

12. An acceleration and angular velocity detector according to claim 10, wherein said displacement detection means includes at least four electrodes having equal areas and disposed orthogonally and symmetrically to each other on one of a bottom surface of said body mass and a surface that is positioned opposite to said bottom surface; one electrode, which is formed on the other of said surfaces; and electric capacity detection means for detecting an electric capacity between each of said at least four electrodes and said one electrode.

13. An acceleration and angular velocity detector according to claim 10, wherein said vibration means includes piezoelectric elements that are formed on said flexible portion, and a vibration signal generator for applying an alternating current voltage to said piezoelectric elements.

14. An acceleration and angular velocity detector according to claim 13, wherein said piezoelectric elements are composed of PZT.

15. An acceleration and angular velocity detector according to claim 14, wherein said flexible portion, said body mass, and said peripheral support member are made of silicon.

16. An acceleration and angular velocity detector comprising:
a body mass;
a flexible portion, which is connected to said body mass, that deforms in consonance with displacement of said body mass;
a peripheral support member for supporting said flexible portion;
a vibration device that vibrates said body mass such that a portion of said body mass moves in a substantially circular motion;
a displacement detection device that independently detects displacements of said body mass in directions of three axes and that outputs a signal; and
a calculation device that detects accelerations in said three directions and angular velocities around said three axes by employing said signal output by said displacement detection device.

17. An acceleration and angular velocity detector according to claim 16, wherein said vibration device causes said portion of said body mass to vibrate in a substantially circular motion in a plane parallel to a plane of said flexible portion.

18. An acceleration and angular velocity detector according to claim 17, wherein said calculation device includes a signal dividing section, which divides said signal into a signal having a low frequency component and a signal having a high frequency component and outputs said signal having a low frequency component as an acceleration signal, and a synchronous detecting section, which outputs an angular velocity signal based on said signal having a high frequency component and a vibration frequency with which said vibration device vibrates said body mass.

19. An acceleration and angular velocity detector according to claim 18, wherein said displacement detection device includes first, second, and third bridge circuits, said first bridge circuit having, in said flexible portion, a first resistor element group, which includes four resistor elements that are formed along one axis of two intersecting axes, and having a first voltage meter; said second bridge circuit having, in said flexible portion, a second resistor element group, which includes four resistor elements that are formed along the other axis of said two intersecting axes, and having a second voltage meter; and said third bridge circuit having, in said flexible portion, a third resistor element group, which includes four resistor elements that are formed along said other axis of said two intersecting axes, and having a third voltage meter.

20. An acceleration and angular velocity detector according to claim 18, wherein said displacement detection device includes at least four electrodes having equal areas and disposed orthogonally and symmetrically to each other on one of a bottom surface of said body mass and a surface that is positioned opposite to said bottom surface; one electrode, which is formed on the other of said surfaces; and an electric capacity detection device that detects an electric capacity between each of said at least four electrodes and said one electrode.

21. An acceleration and angular velocity detector according to claim 18, wherein said vibration device includes piezoelectric elements that are formed on said flexible portion, and a vibration signal generator for applying an alternating current voltage to said piezoelectric elements.

22. An acceleration and angular velocity detector according to claim 21, wherein said piezoelectric elements are composed of PZT.

23. An acceleration and angular velocity detector according to claim 22, wherein said flexible portion, said body mass, and said peripheral support member are made of silicon.

24. An acceleration and angular velocity detector according to claim 16, wherein said vibration device causes said portion of said body mass to vibrate in a substantially circular motion in a plane perpendicular to a plane of said flexible portion.

25. An acceleration and angular velocity detector according to claim 24, wherein said calculation device includes a signal dividing section, which divides said signal into a signal having a low frequency component and a signal having a high frequency component and outputs said signal having a low frequency component as an acceleration signal, and a synchronous detecting section, which outputs an angular velocity signal based on said signal having a high frequency component and a vibration frequency with which said vibration device vibrates said body mass.

26. An acceleration and angular velocity detector according to claims 25, wherein said displacement detection device includes first, second, and third bridge circuits, said first bridge circuit having, in said flexible portion, a first resistor element group, which includes four resistor elements that are formed along one axis of two intersecting axes, and having a first voltage meter; said second bridge circuit having, in said flexible portion, a second resistor element group, which includes four resistor elements that are formed along the other axis of said two intersecting axes, and having a second voltage meter; and said third bridge circuit having, in said flexible portion, a third resistor element group, which includes four resistor elements that are formed along said other axis of said two intersecting axes, and having a third voltage meter.

27. An acceleration and angular velocity detector according to claim 25, wherein said displacement detection device includes at least four electrodes having equal areas and disposed orthogonally and symmetrically to each other on one of a bottom surface of said body mass and a surface that is positioned opposite to said bottom surface; one electrode, which is formed on the other of said surfaces; and an electric capacity detection device that detects an electric capacity between each of said at least four electrodes and said one electrode.

28. An acceleration and angular velocity detector according to claim 25, wherein said vibration device includes piezoelectric elements that are formed on said flexible portion, and a vibration signal generator for applying an alternating current voltage to said piezoelectric elements.

29. An acceleration and angular velocity detector according to claim 28, wherein said piezoelectric elements are composed of PZT.

30. An acceleration and angular velocity detector according to claim 29, wherein said flexible portion, said body mass, and said peripheral support member are made of silicon.

* * * * *